US008601441B2

(12) United States Patent  (10) Patent No.: US 8,601,441 B2
Kaulgud et al.  (45) Date of Patent: Dec. 3, 2013

(54) METHOD AND SYSTEM FOR EVALUATING THE TESTING OF A SOFTWARE SYSTEM HAVING A PLURALITY OF COMPONENTS

(75) Inventors: Vikrant Shyamkant Kaulgud, Maharashtra (IN); Rohit Punja, Maharashtra (IN); Hillel Solomon Awaskar, Maharashtra (IN)

(73) Assignee: Accenture Global Services Limited, Dublin (IE)

( * ) Notice: Subject to any disclaimer, the term of this patent is extended or adjusted under 35 U.S.C. 154(b) by 245 days.

(21) Appl. No.: 13/087,636

(22) Filed: Apr. 15, 2011

(65) Prior Publication Data

US 2012/0017195 A1  Jan. 19, 2012

(30) Foreign Application Priority Data

Jul. 17, 2010 (IN) .......................... 2042/CHE/2010

(51) Int. Cl.
 *G06F 9/44* (2006.01)
 *G06F 11/00* (2006.01)
(52) U.S. Cl.
 USPC ........................................ 717/124; 714/38.1
(58) Field of Classification Search
 USPC ........................... 717/124–135; 714/37, 38.1
 See application file for complete search history.

(56) References Cited

U.S. PATENT DOCUMENTS

| | | | | |
|---|---|---|---|---|
| 5,655,074 A * | 8/1997 | Rauscher | ...................... | 714/38.1 |
| 6,073,107 A * | 6/2000 | Minkiewicz et al. | ........ | 705/7.17 |
| 6,477,471 B1 * | 11/2002 | Hedstrom et al. | .............. | 702/34 |
| 6,519,763 B1 * | 2/2003 | Kaufer et al. | ................. | 717/101 |
| 6,959,431 B1 * | 10/2005 | Shiels et al. | .................. | 717/124 |
| 7,039,902 B2 * | 5/2006 | Kuzmin et al. | ............... | 717/126 |
| 7,490,081 B2 * | 2/2009 | Best et al. | ............................ | 1/1 |
| 7,493,521 B1 * | 2/2009 | Li et al. | ..................... | 714/38.13 |
| 7,581,209 B2 * | 8/2009 | Filho | ............................. | 717/129 |
| 7,617,073 B2 * | 11/2009 | Trinon et al. | ................. | 702/183 |
| 7,917,897 B2 * | 3/2011 | Bassin et al. | ................. | 717/131 |
| 8,024,709 B2 * | 9/2011 | Jadhav et al. | ................. | 717/124 |
| 8,050,890 B2 * | 11/2011 | Trinon et al. | ................. | 702/183 |
| 8,230,265 B2 * | 7/2012 | Rajashekara et al. | ........ | 714/38.1 |
| 8,230,385 B2 * | 7/2012 | Meyer | .......................... | 717/101 |
| 8,271,961 B1 * | 9/2012 | Chithambaram | ............. | 717/132 |
| 8,375,364 B2 * | 2/2013 | Udupa et al. | ................... | 717/124 |
| 2003/0033586 A1 * | 2/2003 | Lawler | .......................... | 717/101 |
| 2003/0188290 A1 * | 10/2003 | Corral | .......................... | 717/101 |

(Continued)

OTHER PUBLICATIONS

McCabe, Thomas J., "A Complexity Measure," Dec. 1976, IEEE, p. 308-320.*

(Continued)

*Primary Examiner* — Qing Chen
(74) *Attorney, Agent, or Firm* — Finnegan, Henderson, Farabow, Garrett & Dunner, LLP

(57) ABSTRACT

Methods and systems are disclosed for evaluating testing of a software system in a testing project in which the testing is performed on software code in a plurality of components of the software system. Multi-dimensional data related to the testing project, including results of the testing, are automatically collected. Values for metrics related to a quality of testing effort that components have undergone in the testing project are developed. In one embodiment, the measure is based on a measure of amount of software code of the plurality of components that has been tested during the testing project. Projected testing results at completion of the testing are developed by forecasting projected values of at least one metric at completion of the testing project.

31 Claims, 23 Drawing Sheets

(56) References Cited

U.S. PATENT DOCUMENTS

| | | | |
|---|---|---|---|
| 2003/0229889 A1* | 12/2003 | Kuzmin et al. | 717/130 |
| 2004/0024571 A1* | 2/2004 | Trinon et al. | 702/186 |
| 2004/0088699 A1* | 5/2004 | Suresh | 717/174 |
| 2004/0103396 A1* | 5/2004 | Nehab | 717/127 |
| 2005/0071807 A1* | 3/2005 | Yanavi | 717/104 |
| 2006/0195724 A1* | 8/2006 | Filho | 714/35 |
| 2007/0168343 A1* | 7/2007 | Best et al. | 707/5 |
| 2007/0174702 A1* | 7/2007 | Meyer | 714/33 |
| 2008/0092120 A1* | 4/2008 | Udupa et al. | 717/124 |
| 2008/0201611 A1* | 8/2008 | Bassin et al. | 714/37 |
| 2008/0282235 A1* | 11/2008 | Jadhav et al. | 717/131 |
| 2010/0023302 A1* | 1/2010 | Trinon et al. | 702/183 |
| 2011/0055620 A1* | 3/2011 | Sengupta | 714/2 |
| 2011/0246834 A1* | 10/2011 | Rajashekara et al. | 714/38.1 |
| 2011/0321007 A1* | 12/2011 | Marum et al. | 717/113 |

OTHER PUBLICATIONS

Kan et al., "In-process metrics for software testing," 2001, IBM Systems Journal, p. 220-241.*

Mizuno et al., "On Estimating Testing Effort Needed to Assure Field Quality in Software Development," 2002, IEEE.*

Nagappan et al., "Early Estimation of Software Quality Using In-Process Testing Metrics: A Controlled Case Study," May 2005, ACM, p. 1-7.*

Runeson, Per, "A Survey of Unit Testing Practices," Jul./Aug. 2006, IEEE, p. 22-29.*

Agrawal et al., "Software Effort, Quality, and Cycle Time: A Study of CMM Level 5 Projects," Jan. 26, 2007, IEEE, p. 145-156.*

Smith et al., "A Survey on Code Coverage as a Stopping Criterion for Unit Testing," 2008, North Carolina State University.*

Kushwaha et al., "Software Test Effort Estimation," May 2008, ACM, p. 1-6.*

Williams et al., "On the Effectiveness of Unit Test Automation at Microsoft," 2009, IEEE, p. 81-89.*

Kemerer et al., "The Impact of Design and Code Reviews on Software Quality: An Empirical Study Based on PSP Data," Jul./Aug. 2009, IEEE, p. 534-550.*

Nageswaran, Suresh, "Test Effort Estimation Using Use Case Points," 2001, Cognizant Technology Solutions, p. 1-6.*

* cited by examiner

FIG. 3a

| COMPONENT HEALTH TESTING REPORT 210 |
|---|
| COMPONENT COVERAGE HEALTH REPORT 310 |
| COMPONENTS SHOWING DECREASING COVERAGE REPORT 320 |
| OVERALL UNFINISHED COMPONENT TESTING - CONCERN AREAS REPORT 330 |
| COMPLEX COMPONENT TESTING - CONCERN AREAS REPORT 350 |

FIG. 3b

COMPONENT COVERAGE HEALTH REPORT 310

Red: coverage < 65% OR negative IncreaseInTestCoverage
Amber: coverage between 65% and 79.9%
Green: coverage equal / above 80%

| Component Name 312 | 2010-03-25 314a | 2010-03-26 314b |
|---|---|---|
| D1 | Red | Red |
| D2 | Red | Red |
| D3 | Red | Red |
| D4 | Red | Red |
| D5 | Red | Green |
| D6 | Red | Red |
| D7 | Red | Red |
| D8 | Red | Red |

FIG. 3c

| COMPONENTS SHOWING DECREASING COVERAGE REPORT 320 ||||
|---|---|---|---|
| Description 324 | Offending Components 322 | Possible reasons 326 | Remediation steps 328 |
| Components are showing decreasing test coverage. This is an abnormal situation caused by code changes while component testing is in progress. | D4 (Red) | Test coverage drops if a code change is not followed by a test plan revision and Nunit / Junit revisions. Code change might be a result of developers adding features as part of a new change request or because those features were missed in the initial coding stage. | Check the code revision logs to identifying the extent of code change for the offending components and the cause of code. Revisit the test plans and Nunit / Junit for these components and ensure that the drop in test coverage is arrested immediately! |

FIG. 3d

| OVERALL UNFINISHED COMPONENT TESTING - CONCERN AREAS REPORT 330 |||
|---|---|---|
| Description 332 | Severity of Issue (in %) 334 | Remediation steps 336 |
| Untested components exist in the project! 331 | 62.5 (Red) | The project has consumed more 25% of its estimated component testing effort. Occurrence of untested components in this phase indicates that only a few components have been selected for testing. Prioritize effort and resources to ensure that all components get attention |
| Poorly tested components exist in the project! 333 | 87.5 (Red) | The project has consumed more 25% of its estimated component testing effort. Occurrence of poorly tested components in this phase indicates slow testing effort! Prioritize effort and resources to ensure that test coverage for components selected for testing reach optimal coverage soon. |

FIG. 3e

COMPONENT COMPLEXITY CHART 340

| COMPONENT 342 | COMPONENT SIZE 344 | FUNCTIONAL COMPLEXITY 346 |
|---|---|---|
| C1 | 15 | High |
| C2 | 3 | Medium |
| C3 | 1 | Simple |
| C4 | 6 | High |
| C5 | 1 | Simple |
| C6 | 7 | High |
| C7 | 2 | Medium |
| C8 | 4 | Medium |

FIG. 3f

| | COMPLEX COMPONENT TESTING - CONCERN AREAS REPORT 350 | |
|---|---|---|
| Description 352 | Severity of Issue (in %) 354 | Remediation steps 356 |
| Untested complex components exist in the project! 351 | 33.33333588 (Red) | The project has consumed more than 25% of its estimated component testing effort. Occurrence of untested complex components in this phase is unusual. Prioritize effort and resources to ensure that complex components get priority attention. |
| Poorly tested complex components exist in the project! 353 | 100 (Red) | The project has consumed more than 25% of its estimated component testing effort. Occurrence of poorly tested complex components in this phase is unusual. Prioritize effort and resources to ensure that complex components get priority attention. |

FIG. 4a

| QCTE ANALYSIS REPORT 220 |
|---|
| TABLE 410- QUALITY OF COMPONENT TESTING EFFORT |
| GRAPH 420 - QUALITY OF COMPONENT TESTING EFFORT |

FIG. 4b

| FORECAST TABLE 410 - QUALITY OF COMPONENT TESTING EFFORT (1: Good, 0: Worst) |||
|---|---|---|
| Date 412 | Forecasted Quality 416 | Current Quality 414 |
| 2010-03-25 | 0          (Red) | 0        (Red) |
| 2010-03-26 | 0          (Red) | 0.125  (Red) |
| 2010-03-27 | 0.25       (Red) | |
| 2010-03-28 | 0.379999995 (Red) | |
| 2010-03-29 | 0.5        (Amber) | |
| 2010-03-30 | 0.629999995 (Amber) | |
| 2010-03-31 | 0.75       (Amber) | |

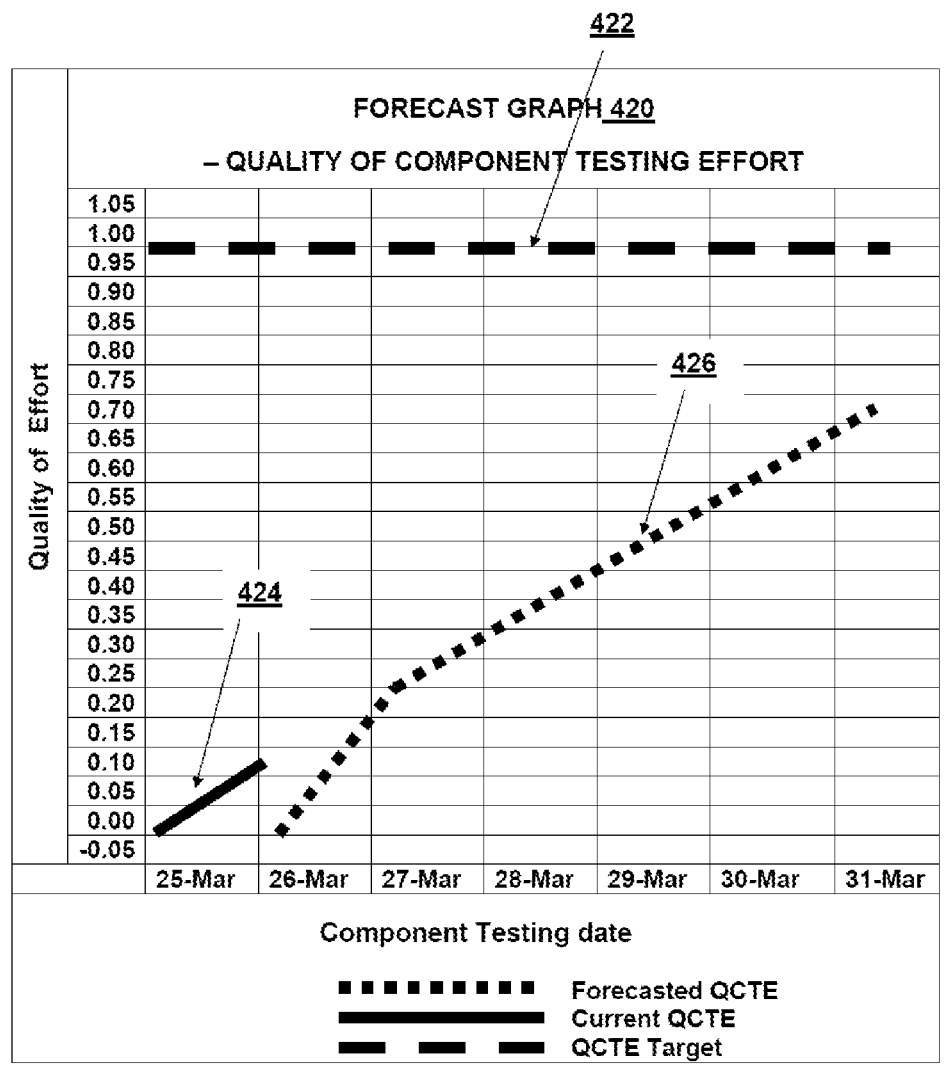

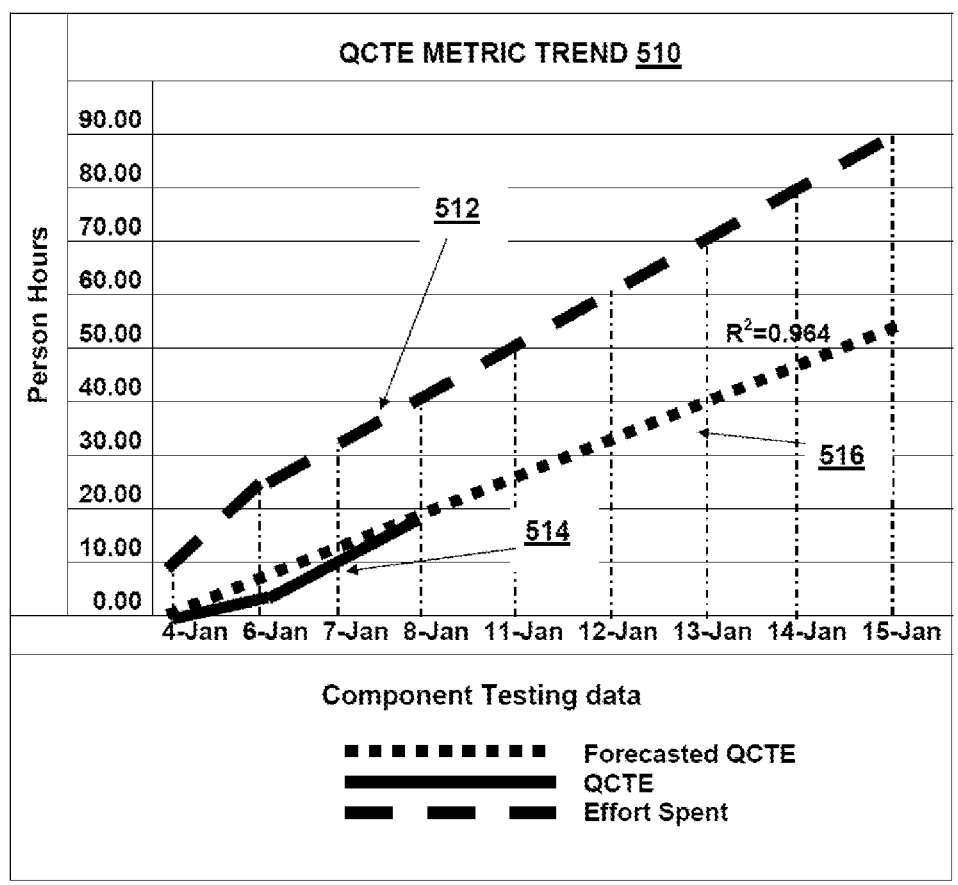

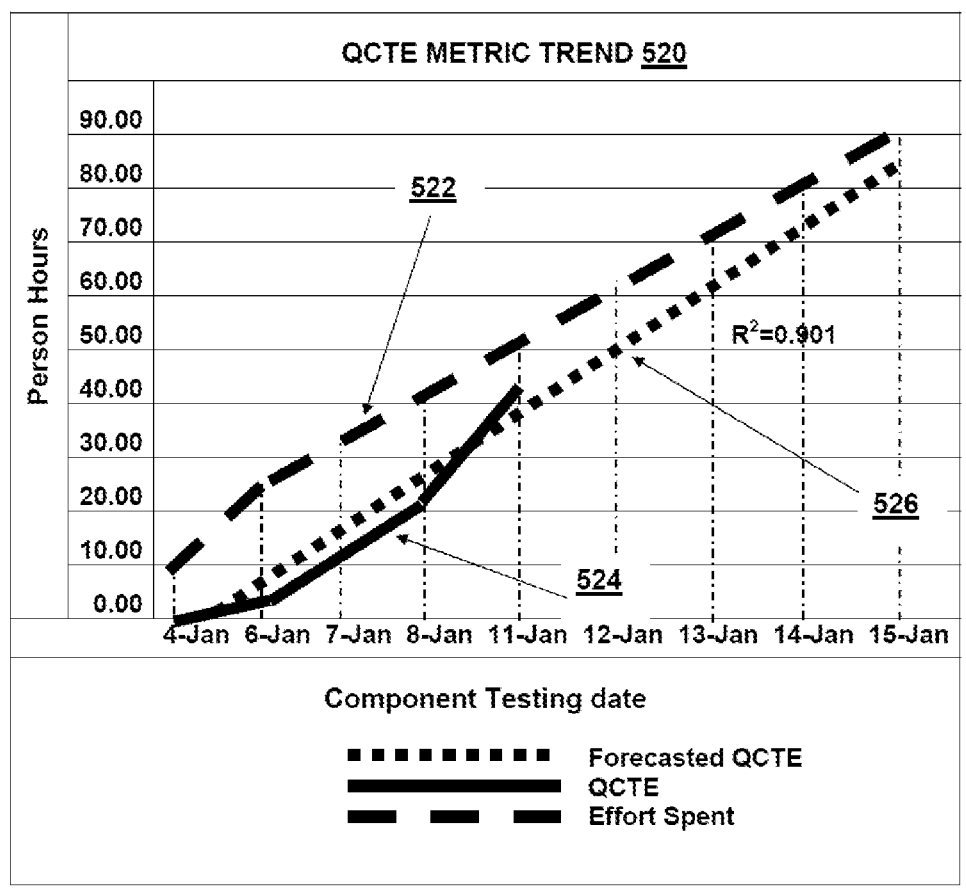

FIG. 6a

| Component Name 612 | Increase In Test Coverage 630 | |
|---|---|---|
| | 2010-03-25 614a | 2010-03-26 614b |
| D1 | 0 (Amber) | 0 (Amber) |
| D2 | 0 (Amber) | 0 (Amber) |
| D3 | 0 (Amber) | 0 (Amber) |
| D4 | 57.90000153 | -13.3000031 (Red) |
| D5 | 0 (Amber) | 81 |
| D6 | 0 (Amber) | 23.60000038 |
| D7 | 0 (Amber) | 0 (Amber) |
| D8 | 0 (Amber) | 0 (Amber) |

INCREASE IN TEST COVERAGE REPORT 230

FIG. 6b

| INCREASE IN TEST COVERAGE REPORT 235 | | | | | | | |
|---|---|---|---|---|---|---|---|
| Component Name 622 | Increase In Test Coverage 630 | | | | | | |
| | 6-Jan 624a | 7-Jan 624b | 8-Jan 624c | 11-Jan 624d | 12-Jan 624e | 13-Jan 624f | 14-Jan 624g |
| C1 | 23.60% | 65.50% | -3.10% (Red) | 7.00% | 0.00% | 0.00% | 1.40% |
| C2 | 0.00% | 0.00% | 89.50% | 10.50% | 0.00% | 0.00% | 0.00% |
| C3 | 0.00% | 0.00% | 100.00% | 0.00% | 0.00% | 0.00% | 0.00% |
| C4 | 0.00% | 0.00% | 25.30% | 61.50% | 0.00% | 0.00% | -5.30% (Red) |
| C5 | 0.00% | 0.00% | 0.00% | 100.00% | 0.00% | 0.00% | 0.00% |
| C6 | -13.30% (Red) | 25.30% | 2.90% | 0.00% | 0.00% | 0.00% | 14.30% |
| C7 | 81.00% | 0.00% | 0.00% | 0.80% | 0.00% | 0.00% | 18.20% |
| C8 | 0.00% | 0.00% | 25.40% | 0.00% | 0.00% | 0.00% | 71.20% |

FIG. 7a

| ALL METRICS REPORT 240 | | |
|---|---|---|
| Metric Name 750 | 2010-03-25 760a | 2010-03-26 760b |
| Number Of Poorly Tested Complex Components 792 | 3 | 3 |
| Number Of Poorly Tested Components 752 | 8 | 7 |
| Number Of Untested Complex Components 791 | 2 | 1 |
| Number Of Untested Components 751 | 7 | 5 |
| QCTE 759 | 0 | 0.125 |
| Ratio Of Poorly Tested Complex To Total Components 796 | 100 | 100 |
| Ratio Of Poorly Tested To Total Components 756 | 100 | 87.5 |
| Ratio Of Untested Complex To Total Components 795 | 66.66667175 | 33.33333588 |
| Ratio Of Untested To Total Components 755 | 87.5 | 62.5 |

FIG. 7b

| ALL METRICS REPORT 245 | | | |
|---|---|---|---|
| Metric Name 770 | 4-Jan 780a | 6-Jan 780b | 7-Jan 780c |
| Number Of Untested Components 751 | 7 | 5 | 5 |
| Number Of Components With Poor Coverage 752 | 8 | 7 | 6 |
| Average Increase Of Test Coverage 753 | | 11.41% | 11.35% |
| Number Of Components With Deteriorating Coverage 754 | | 1 (Red) | 0 |
| Ratio Of Untested To Total Components 755 | 7.5 | 6.5 | 6.5 |
| Ratio Of Poor Coverage Components To Total Components 756 | 8 | 7.5 | 7 |
| Number Of Complex Components With Poor Coverage 792 | 3 | 3 | 2 |
| Number Of Untested High Complexity Components 791 | 2 | 1 | 1 |

FIG. 8a

| BASIC COVERAGE REPORT 250 | | |
|---|---|---|
| Component Name 812 | Code Coverage 810 | |
| | 2010-03-25 814a | 2010-03-26 814b |
| D1 | 0 (Red) | 0 (Red) |
| D2 | 0 (Red) | 0 (Red) |
| D3 | 0 (Red) | 0 (Red) |
| D4 | 57.90000153 | 44.59999847 |
| D5 | 0 (Red) | 81 |
| D6 | 0 (Red) | 23.60000038 |
| D7 | 0 (Red) | 0 (Red) |
| D8 | 0 (Red) | 0 (Red) |

FIG. 8b

| CODE COVERAGE THRESHOLDS CHART 820 | | | |
|---|---|---|---|
| Code Coverage | Component | CodeCoverage Metric | Code Coverage Threshold |
| Healthy | Acceptably Tested | 80% ≤ X | Optimum Threshold at 80% |
| Unhealthy | Poorly Tested | 65% ≤ X < 80% | Tolerable Code Coverage Band |
| | | 0 %< X < 65% | Lowest Tolerable Threshold at 65% |
| | Untested | X = 0% | |

FIG. 8c

| CHART 830: TEMPORAL THRESHOLDS (AND SEVERITY LEVELS) FOR COMPONENTS IN A SYSTEM UNDERGOING TESTING ||| 
|---|---|---|
| Elapsed schedule | Ratio Of Untested To Total Components 755 | Ratio Of Poorly Tested To Total Components 756 |
| 0% to 25% | Any Value Of The Ratio (Amber) | Any Value Of The Ratio (Amber) |
| 25% to 50% | x ≤ 50% (Amber) | x ≤ 50% (Amber) |
| 25% to 50% | x > 50% (Red) | x > 50% (Red) |
| 50% to 75% | x < 20% (Amber) | x < 20% (Amber) |
| 50% to 75% | x ≥ 20% (Red) | x ≥ 20% (Red) |
| Above 75% | Any Value Of The Ratio (Red) | Any Value Of The Ratio (Red) |

FIG. 8d

| CHART 840: TEMPORAL THRESHOLDS (AND SEVERITY LEVELS) FOR COMPLEX COMPONENTS ||| 
|---|---|---|
| Elapsed schedule | Ratio Of Untested Complex To Total Components 795 | Ratio Of Poorly Tested Complex To Total Components 796 |
| 0% to 25% | Any Value Of The Ratio (Amber) | Any Value Of The Ratio (Amber) |
| 25% to 50% | x < 30% (Amber) | x < 50% (Amber) |
| 25% to 50% | x ≥ 30% (Red) | x ≥ 50% (Red) |
| Above 50% | Any Value Of The Ratio (Red) | x < 10% (Amber) |
| Above 50% | Any Value Of The Ratio (Red) | x ≥ 10% (Red) |

METHOD AND SYSTEM FOR EVALUATING THE TESTING OF A SOFTWARE SYSTEM HAVING A PLURALITY OF COMPONENTS

This application is based upon and claims the benefit of priority to Indian Patent Application No. 2042/CHE/2010, filed Jul. 17, 2010, which is incorporated herein by reference in its entirety.

TECHNICAL FIELD

The present disclosure relates to the field of software development.

BACKGROUND

As known in the art, software code comprises instructions that may be used to control or instruct the operation of one or more processing devices, such as microprocessors, microcontrollers, co-processors, etc. A software development project involves several types of tasks, such as creating code (also known as coding), writing tests for the code, performing the tests, analyzing the results, and debugging. A typical software system is organized into individual units of code also known as components or modules. A software development project is organized into multiple phases, including but not limited to software design, in which specifications for the software and its constituent components are developed; software implementation, in which the code for the components is created; component testing (or unit testing), in which the components of the software system are individually tested for operability and compliance with component requirements; integration, in which the components are assembled to form the desired software system; system qualification, in which the assembled system is tested for operability and compliance with system requirements; and acceptance, in which the end user or a representative of the end user tests the newly developed system in order to determine whether to accept or reject the system.

Thus, a defect in software code may be identified as a result of testing such as Component Test (CT), System Test (ST), and a User Acceptance test (UAT). It is preferable to identify and correct a defect as soon as possible in a software development project. Defects may be introduced in any stage of a computer system development effort. For example, they may be introduced as early as the requirements stage. Such defects may be detected through reviews and tools that hold review documents such as requirements, design etc. Defect slippage, in which defects that occur in one stage occur in subsequent stages, has several impacts. Defects that occur but are not caught during CT could slip into the production version of the code and cause the system to be not accepted. In addition, the cost or effort of rework in subsequent stages may be increased. Defects may be harder to identify when code from other components is present, and a change to correct a component's defective code may not only impact code in the component but in other components as well. Further, the effectiveness of ST/UAT is reduced since testers are now bogged down with identifying CT defects.

Testing computer code is not a process of uniform complexity. Code of increased complexity is harder to write, harder to debug, harder to integrate into a component, and harder to test. In addition, components with more complex code are harder to write, harder to debug, and harder to integrate into a system of other components. In addition, the complexity of a component is a function of attributes such as the size of the component (for example, in number of lines of code) and the specified features or functionality of the component.

One measure of extent of software code testing is termed "code coverage," which measures the degree to which the source code has been tested through use of a test suite. It is a form of testing that inspects the code directly. Code coverage measures how well the program is exercised by the test suite and thus the quality of the testing. A code coverage analysis tool may track and count the number of lines of code in the program that a test suite executed, or it may track and count "touched" features of the codes such as functions, subroutines, nodes, branch, control structures (such as IF statements), conditions and decisions. For Boolean sub-expressions, it may track and count whether the expression was evaluated both to true and false. Code coverage is defined by the developers and testers according to the needs of the project. For example, code coverage may be defined according to one or more of the tracked and counted code features described above.

State of practice defines thresholds for a development team. The thresholds may define time or output requirements of a team, or they may define code quality requirements for the project. They may also define code coverage thresholds. For example, the extent of testing conducted on a unit of code testing may be deemed acceptable for purposes of the development project if the code coverage, as it is defined by the team, reaches a selected value or values. In addition, since components are of varying complexity, time or output thresholds, code quality thresholds, and code coverage thresholds may vary with the complexity of the components of a project Software is sometimes developed using the so-called "Agile" software development methodologies, which feature disciplined project management, teamwork, engineering best practices designed to rapidly deliver high-quality software, and a focus on aligning customer needs and company goals. Another approach is the so-called "Waterfall" methodology, in which requirements, analysis, design, coding, and testing are conducted in a highly structured, strict, and pre-planned sequence. Typically component testing in Agile projects is performed using practices such as Test Driven Development, in which a developer writes a test that defines a desired improvement or new function, produces code to pass that test, and then refactors the new code to acceptable standards. Component testing in non-Agile projects is performed typically after the code is developed.

In addition, there may be more than one approach to component testing. One approach involves testing one component at a time and completing its testing before moving on to test the next component. This approach may be called depth-wise CT. Another approach is testing a batch of components concurrently and striving to achieve high percentages of code coverage for coverage for the selected batch. The approach may be called breadth-wise CT. Both approaches have their benefits and disadvantages. For example, a depth-wise CT strategy typically results in a high level of confidence in the quality of the code in tested components, but it may also result in other components not being tested at all. A breadth-wise CT strategy typically results in a high level of confidence in the code in multiple components being essentially the same quality, but it may also result in none of the components being tested to an acceptable level.

The approach selected for use by a development team may depend on several factors. For example, if all components are equally important to the operation of the software system under development, the team may select a breadth-wise CT strategy. If, on the other hand, some components particularly need to be defect-free, the team may select a depth-wise CT strategy. It would be desirable to analyze system data to define a CT strategy so as to optimize the code coverage in the available schedule and planned effort, give the project objectives. In addition, it would be desirable to analyze testing patterns and trends to identify problems in a CT strategy underway and to amend the CT strategy in terms of schedule or planned effort according to desired objectives.

Irrespective of the practice used, the quality of the component testing is determined primarily by the code coverage—how much of the code is covered by component tests—and secondly by number of component tests that pass.

Among the technical testing challenges that development teams face is data collection. Projects may use different technologies, e.g. Net, Java and database technologies. Each technology has its preferred component testing tools. Projects find it difficult to manually collect data from these tools. Further, in most projects, there are always a number of "legacy" components that are of no interest from a monitoring and optimization standpoint. Projects find it difficult to automatically filter data from component testing tools to focus only on the relevant data. Furthermore, projects find it challenging to collate this diverse data into a cohesive and coherent form to make sense out of it and take decisions.

Another challenge is related to finding patterns in the data. Tools typically provide a "point-in-time" data for component testing. For example, a coverage tool will provide the code coverage at the time of execution. The data for that testing even is thus static, "frozen" in time. In addition, a coverage tool that is run for a longer period, say ten days, generates multiple sets of "point-in-time" data. It can be challenging for projects to identify trends in this temporal data. Further, it is can be challenging to understand the implications of trends on schedules and effort spent so far and on schedule and effort estimates.

Typically, the state of practice provides no intuitive insight available through raw data. Multi-faceted analysis of data coming out of the component testing process is not common. For example, code coverage data does not demonstrate on its face whether the project will achieve optimal component testing at the end of the estimated schedule. Further, it does not demonstrate whether a team should test multiple components at once or focus on one component at a time.

A third challenge relates to finding correlations between component testing and other phases of the project. For example, code change may occur in several phases of a project. The changes could result from an implementation of a formal change request, for example, to fix an identified defect or fault, or from a more informal code change that was not necessarily in response to an identified defect or fault. Such changes, sometimes known as "code churn," may be defined as lines of code added, modified or deleted to a file from one version to another. Code churn may take the form of User, Date/Time, Changeset, Portfolio Project, or Path code churns.

No matter their origin or classification, code changes in one component may have unintended impacts on the functioning of the revised component and on the other components of the system. Consequently, components need to be tested after code changes, even during phases of the project subsequent to CT. Although a team might have access to information about change requests and code churn, or it may determine the existence of a trend of reduction in a component's code coverage, the change requests and code churn data and the identified trends may not be sufficient in themselves to identify potential impact on component testing.

It would be desirable to provide structured proactive guidance to code development teams related to the potential risk that is being injected into the project if CT is not managed properly, the parameters beyond coverage that may be of interest to a team, and remediation steps that could or should be taken.

SUMMARY

Systems and methods for evaluating testing of a software system in a testing project in which the testing is performed on software code in a plurality of components of the software system, are herein described. In one embodiment, the testing comprises automatically collecting, by a processor, multi-dimensional data related to the testing project, including results of the testing. The processor may develop a Quality of Component Test Effort (QCTE) measure for the testing project.

QCTE may comprise a quality of testing effort that the plurality of components have undergone in the testing project, and the QCTE measure is based on a measure of amount of software code of the plurality of components that has been tested during the testing project and a measure of extent of completion of the testing project.

In one embodiment, the processor may develop the measure of the extent of completion of the testing project, a current QCTE measure comprising the QCTE measure to date for the testing project; and projected testing results at completion of the testing, by forecasting a projected QCTE measure at completion of the testing project. The processor may further analyze the multi-dimensional data, the measure of the current extent of completion of the testing, the current QCTE measure, and the projected QCTE measure to identify an area of potential concern in the software system.

In one embodiment, forecasting comprises developing a measure of predicted likelihood that the testing will achieve an optimal level of component testing according to a target testing schedule or targeted testing effort. In one embodiment, the remediation advice may be developed for the identified area of concern using best practices extracted from other software system projects. The analyzing may comprise developing insight from the multi-dimensional data, the measure of the current extent of testing, and the current QCTE measure; and coupling the insight with the best practices to develop the remediation advice.

In one embodiment, a projected completion date of the testing to a target extent of completion may be developed. A measure of a first estimated effort to complete the testing to the target extent may developed, and a second estimated effort to complete the testing according to a target testing schedule may also be developed.

In one embodiment, the QCTE measure may be based on a count of components having amounts of tested software code above a threshold amount. In another embodiment, the QCTE measure may be generated from an amount of scheduled effort consumed by the testing, and a percentage of components determined to have amounts of tested software code above a threshold level.

In another embodiment, the QCTE measure may be a value generated based on the equation:

$$QCTE = (EffortSpent) * \left(1 - \frac{UnhealthyComponentsIndex}{TotalNumberOfComponents}\right);$$

with

EffortSpent=the measure of the extent of completion of the testing project;

UnhealthyComponentsIndex=an indicator of the extent of unhealthiness of code coverage that is exhibited by the components of the computer system undergoing testing; and TotalNumberOfComponents=a count of the components being tested.

In one embodiment, the extent of unhealthiness of code coverage that is exhibited by the components of the computer system undergoing testing may be a count of components in which the amount of tested software code is below a selected threshold level. In another embodiment, the extent of unhealthiness of code coverage may be a weighted measure of the extent of code coverage that is exhibited by the components of the computer system undergoing testing. The components included in UnhealthyComponentsIndex may be weighted by the extent of their code coverage levels.

In another embodiment, the extent of unhealthiness of code coverage may be based on an amount of software code that has been tested during the testing project, which may comprise a count of lines of software code in the selected component that have been executed during the testing. In another embodiment, the amount of software code that has been tested during the testing project may comprise a count of software codes feature in the selected component that have been tested during the testing.

In one embodiment, a system and method for evaluating testing of a software system in a testing project in which the testing is performed on software code in a plurality of components of the software system may comprise automatically collecting, by a processor, multi-dimensional data related to the testing project, including results of the testing. The processor may develop, for a component in the plurality of components, a value for a metrics related to a quality of testing effort that the component has undergone in the testing project. The quality of testing effort for the component may be based on a measure of amount of software code of the component that has been tested during the testing project. The processor may develop projected testing results at completion of the testing, by forecasting projected values of the metric at completion of the testing project.

In one embodiment, the processor may analyze the multi-dimensional data, a measure of the current extent of completion of the testing, and the metrics to identify an area of potential concern in the software system. In a further embodiment, remediation advice may be developed for the identified area of concern using best practices extracted from other software system projects. In another embodiment, the analyzing may further comprise developing insight from the multi-dimensional data, the measure of the current extent of testing, and the metrics; and coupling the insight with the best practices to develop the remediation advice. In a further embodiment, at least a subset of the metrics are further based on a level of complexity of the software code in the plurality of components.

In one embodiment, a computer program is configured to perform the methods described here. The program may be embodied on a non-transitory computer readable medium and may comprise modules encoding interrelated and interdependent processes, including a multi-dimensional data collecting module, a metrics module, and a results projecting module.

In another embodiment, a system for evaluating the described testing may comprise a processor and a non-transitory computer-readable medium encoding instructions for evaluating the testing of the software system. The instructions may include instructions for a multi-dimensional data collecting module configured to automatically collect multi-dimensional data related to the testing project, including results of the testing; and a metrics module configured to develop the QCTE measure for the testing project.

Additional objects and features of the disclosure will be set forth in part in the description which follows, and in part will be obvious from the description, or may be learned by practice of the disclosed embodiments. The objects and features of the application will be realized and attained by means of the elements and combinations particularly pointed out in the appended claims.

It is to be understood that both the foregoing general description and the following detailed description are exemplary and explanatory only and are not restrictive of the application, as claimed.

The accompanying drawings, which are incorporated in and constitute a part of this specification, illustrate several embodiments of the application and together with the description, serve to explain the principles of the application.

BRIEF DESCRIPTION OF THE DRAWINGS

FIG. 1b is a block diagram of an exemplary software development component testing analysis system 100 from the software development system 50 shown in FIG. 1a;

FIG. 3a is an exemplary embodiment of the Component Health Testing report 210 shown in FIG. 2;

FIG. 3b is an exemplary embodiment of the Component Coverage Health report 310 shown in FIG. 3a;

FIG. 3c is an exemplary embodiment of the Components Showing Decreasing Coverage report 320 shown in FIG. 3a;

FIG. 3d is an exemplary embodiment of the Overall Unfinished Component Testing—Concern Areas report 330 shown in FIG. 3a;

FIG. 3e is an exemplary Component Complexity chart 340;

FIG. 3f is an exemplary embodiment of the Complex Component Testing—Concern Areas report 350 shown in FIG. 3a;

FIG. 4a is an exemplary embodiment of the Quality of Component Testing Effort (QCTE) Analysis report 220 shown in FIG. 2;

FIG. 4b is an exemplary embodiment of the forecast table 410 of Quality Of Component Testing Effort shown in FIG. 4a;

FIG. 4c is an exemplary embodiment of a forecast graph 420 of the forecast table 410 shown in FIG. 4a;

FIGS. 5a-5c are charts illustrating QCTE metrics trends as they develop over time during a software system development project;

FIG. 6a is an exemplary embodiment of an Increase In Test Coverage report 230 shown in FIG. 2;

FIG. 6b is another exemplary embodiment of an Increase In Test Coverage report;

FIG. 7a is an exemplary embodiment of an All Metrics report 240 shown in FIG. 2;

FIG. 7b is another exemplary embodiment of an All Metrics report;

FIG. 8a is an exemplary embodiment of a Basic Coverage report 250 shown in FIG. 2;

FIG. 8b is a chart 820 illustrating exemplary code coverage thresholds;

FIG. 8c is a chart 830 illustrating one embodiment of temporal thresholds and severity levels for components in a system undergoing testing;

FIG. 8d is a chart 840 illustrating an embodiment of temporal thresholds and severity levels for complex components in a system undergoing testing;

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts.

Figure 1A:
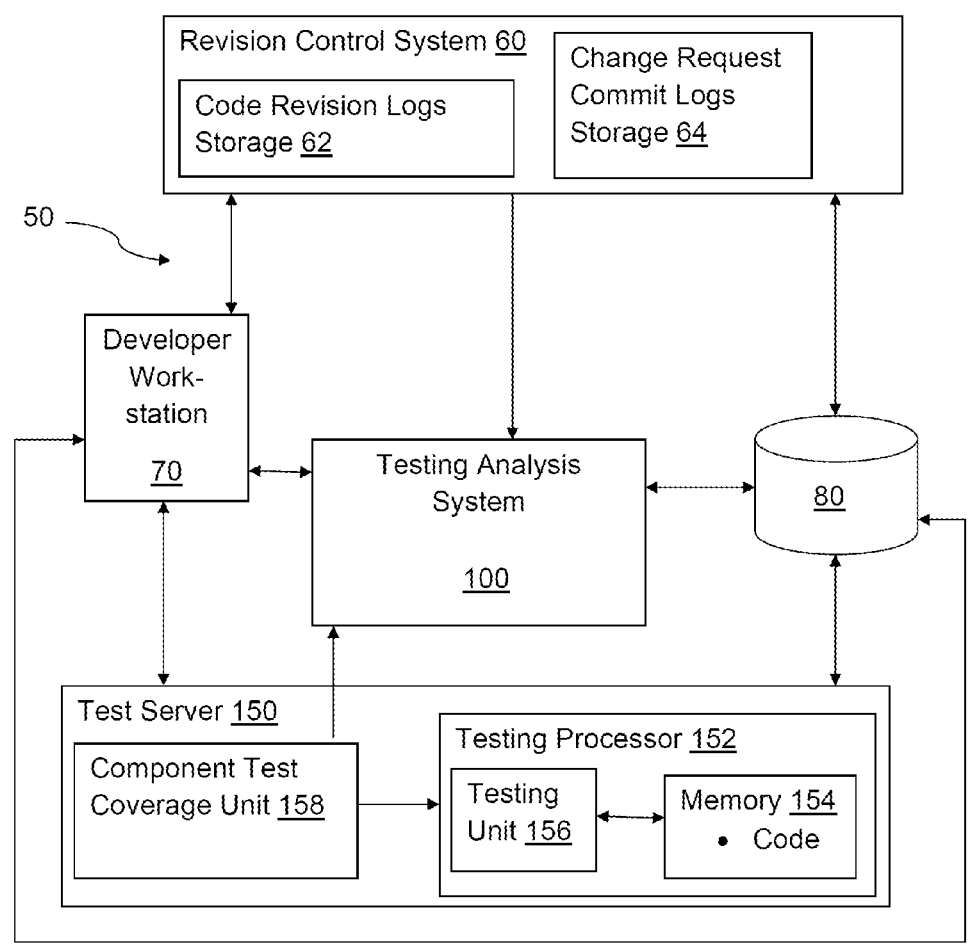
FIG. 1a is a block diagram of an exemplary software development system 50.

FIG. 1a shows portions of an exemplary software development system 50 consistent with the disclosure herein. The system 50, which provides support for the development and testing of software systems, has a developer workstation 70 operatively connected to a database 80 for storing the code under development and development tools, a revision control system 60, which may be a server, for keeping track of changes made to software code, a test server 150 for testing code for defects and errors, and a software development component testing analysis system 100 (also known as testing analysis system 100 or system 100) for providing estimates of extent of completion and quality of code testing, forecasts of projected results related to the testing; identifications of areas of potential concern in the software development project, and remediation advice for the identified areas of concern.

Figure 1B:
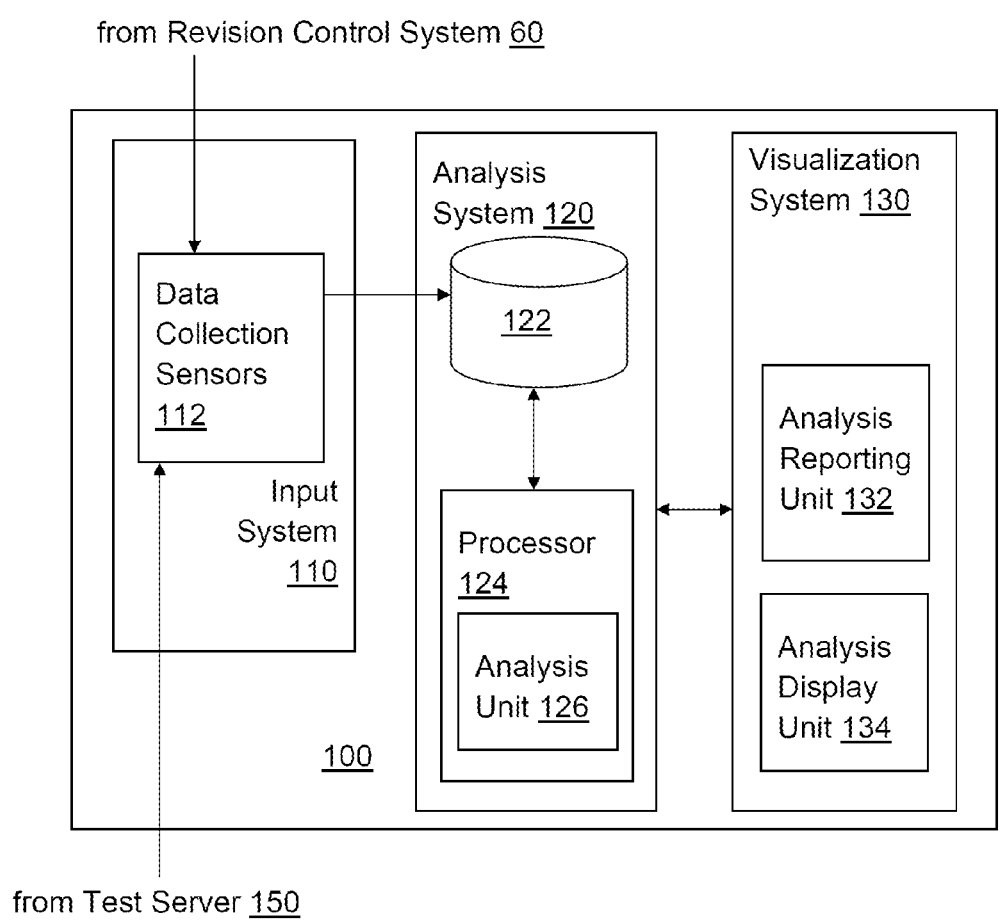

The revision control system 60 has a storage unit 62 for storing code revision logs (for recording data related to any code churns) and a storage unit 64 for storing change request commit logs (for recording data related to code changes made due to change requests). Revision control systems include, for example, the IBM Clearcase system, the Apache Subversion system, and the Concurrent Version system. The test server 150 has a test processor 152 with a memory 154 (for storing the code undergoing testing and the test suites) and a testing unit 156 configured to access the memory 154 for the code and the test suites and then to perform the tests on the code. The test server 150 also has a component test coverage unit 158 to generate cover coverage values based on the agreed-upon definition of code coverage As shown in FIG. 1b, the testing analysis system 100 may comprise an input system 110, an analysis system 120, and a visualization system 130. The input system 110, which in one embodiment may reside on a workstation (not shown), is configured to receive data related to the developer's or several developers' coding and testing activities. Such activities may include but are not limited to writing, debugging, editing, testing and saving code. In one embodiment, the input system 110 may have data collection sensors 112 configured to receive data arising from the operation of development tools such as code quality or other evaluative testing tools used remote from or locally at the developer workstation. Examples of code quality tools include but are not limited to PMD, Checkstyle, Findbugs, Jdepend, and JavaNCSS; and examples of testing tools include but are not limited to Junit harnesses, Ncover, Emma, and Cobertura. The input system 110 may receive data arising from the operation of IDEs such as, for example, the EMC™ IDE, the Microsoft™ .NET framework, the Microsoft™ Visual Studios IDE for writing and debugging code, and the Eclipse™ IDE for incorporation of open source code.

The input system 110 may also receive data arising from or at test servers such as test server 150 due to the operation of test suites. The input system 110 may also receive data arising from or at the build servers, not shown, upon which the code is aggregated and compiled. Examples of build server event data may include but are not limited to identification of the test suite, the run results of the test suite, data about a failing of a test, and data from a module that failed. The input system 110 may also receive data arising from or at the revision control system 60.

The input system 110 is coupled to the analysis system 120 and is configured to submit data to the analysis system 120, which may have a database 122 for storing the data received from the data collection sensors 112 in the input system 110. The analysis system 120 may also have a processor 124 with an analysis unit 126 for performing the testing analyses disclosed herein. The analysis system 120 is coupled to the visualization system 130 and is configured to output data related to the results of the testing analysis performed by the processor 124. The visualization system 130, which is configured to receive the testing results, has an analysis reporting unit 132, which is configured to create the analysis reports described in detail below. The visualization system 130 also has an analysis display unit 134, which is configured to display the testing results on a developer's workstation 70 (as shown in FIG. 1a) in the form of the analysis reports or in any convenient form or manner.

One of skill in the art will appreciate that although only one of each of the components identified above is depicted in FIGS. 1a and 1b, any number of any of these components may be provided. Furthermore, one of ordinary skill in the art will recognize that there may be more than one developer workstation 70 and that functions provided by one or more components of any of the disclosed systems may be combined or incorporated into another component shown in FIGS. 1a and 1b. For example, the test server 150 and the analysis system 120 could be one component, the processor 124 could be combined with testing processor 152, or the database 122 could be used to store the data and instructions used or created by any of the disclosed components.

One or more of the components depicted in FIGS. 1a and 1b may be implemented in software on one or more computing systems. For example, they may comprise one or more applications, which may comprise one or more computer units of computer-readable instructions which, when executed by a processor, cause a computer to perform steps of a method. Computer-readable instructions may be stored on a computer-readable medium, such as a memory or disk. Such media typically provide non-transitory storage. Alternatively, one or more of the components depicted in FIGS. 1a and 1b may be hardware components or combinations of hardware and software such as, for example, special purpose computers or general purpose computers. A computer or computer system may also comprise an internal or external database. The components of a computer or computer system may connect through a local bus interface.

In certain embodiments, one or more of the components shown in FIGS. 1a and 1b may be a computer server with web services enabled. For example, the test server 150 or the analysis system 120 could contain a processor web service for processing testing data. The components depicted in FIGS. 1a and 1b may be operatively connected to one another via a network, not shown, such as the Internet or an intranet, or via any type of wired or wireless communication system. Connections may be implemented through a direct communication link, a local area network (LAN), a wide area network (WAN) and/or other suitable connections.

The databases 80, 122 and storage units 62, 64 may be implemented as separate databases and repositories as shown in FIGS. 1a and 1b or as one or more internal databases stored, for example, on the analysis system 120 or with the test server 150. Databases 80, 122 and storage units 62, 64 may be accessed by other components in systems 50, 100, or 150 directly via an external connection or via a network (not shown).

The Analysis Unit 126

The analysis unit 126 is configured to process the testing data, generate metrics related to the testing and perform the testing analyses disclosed herein in order to analyze the quality of component testing, for example in a software system development project. It generates the values for the metrics described below, identifies testing trends, generates forecasts based on the metrics values, and generates guidance to team members to optimize testing based on the values. The analysis unit 126 may forward the metric values trends, forecasts, and guidance to the analysis reporting unit 132, which may populate the Analysis report 200 with the information.

Testing Metrics

Several metrics, the values for which may be displayed in the All Metrics reports 240, 245 shown in FIGS. 7a and 7b, may be used to monitor the component testing effectiveness from a coverage perspective. The analysis unit 126 is configured to identify the extent of testing of each component in the software system and to generate metrics for the system undergoing testing.

As disclosed above, the extent to which testing has been completed on a component may be determined by calculating code coverage metric values for each component according to the code coverage definition specified by the development team. As described above, code coverage metrics measure the degree to which the source code has been tested through use of a test suite.

The analysis unit 126 is configured to generate the Code-Coverage metric 810, shown in the Basic Coverage report 250 (FIG. 8a) in any way considered suitable by the testing team. the CodeCoverage metric 810 may be based on several characteristics of the code, such as lines of code, functions, subroutines, nodes, branch, control structures (such as IF statements), or conditions and decisions that are exercised by the test suite. A team will select the appropriate CodeCoverage metric based on team and project objectives.

As testing progresses, the test suite accesses and exercises more and more source code. Therefore, as testing progresses and more code is exercised, assuming that there have been no changes to the software code of a component, it is likely that the value of a component's CodeCoverage metric will increase. In one embodiment, the metric 810 may show a sharp upward trend and then it may become shallow or plateaued as the CodeCoverage metric value reaches its threshold value or the component test cycle comes to an end point. A low value for the CodeCoverage metric may demonstrate an unacceptable level of code coverage, which may indicate that the testing on the component has been of poor quality. A low value for the CodeCoverage metric 810 may also not be unacceptable. For example, the test plan may not call for testing of the measured component until later in the test cycle, and a low value of the CodeCoverage metric may simply reflect the currently anticipated level of testing according to the established schedule.

The analysis unit 126 may be configured to assign a component coverage level, for example, an extent code, to indicate the extent (or health) of code coverage of each component. For example, a component may be deemed to have an unacceptable level, marginal level, or acceptable level of code coverage. An unacceptable level of code coverage may indicate that the testing on the component has been of poor quality. A marginal level may indicate that testing quality is questionable. An acceptable level may indicate that the quality of testing of the component is sufficiently high to pass the project's acceptability threshold.

FIG. 8b is a chart 820 illustrating an exemplary code coverage threshold. In one embodiment, a component may be deemed to be untested when the CodeCoverage metric value for the component is 0%. The component may be deemed to have unacceptable (or unhealthy) code coverage on a selected testing date when its CodeCoverage metric value is less than the lowest tolerable code coverage threshold of 65% or when the value of its CodeCoverage metric or IncreaseInTestCoverage metric, described below, shows a decrease. A component may be deemed to have tolerable but questionable code coverage on a selected testing date when its CodeCoverage metric value is in the tolerable code coverage band of greater than or equal to 65% or less than 80%. A component may be deemed to have acceptable code coverage when its CodeCoverage metric value is in the optimum code coverage threshold of greater than or equal to 80%. In one embodiment, the component may be deemed poorly tested when its CodeCoverage metric value is greater than 0% but it is not at the optimum code coverage threshold of 80%.

Alerted by a low CodeCoverage metric value, the development team may analyze the test plan to determine whether the testing of the component with poor CodeCoverage metric values is not scheduled until later in the test cycle. the team may also take measures to improve the testing plan so that the component's code is exercised enough by the test suite to correct the deficiency in testing.

The IncreaseInTestCoverage metric 630, shown in the Increase In Test Coverage reports 230, 235 (FIGS. 6a and 6b), demonstrates an increase in a component's code coverage over time. The analysis unit 126 is configured to generate the IncreaseInTestCoverage metric 630 in any way considered suitable by the testing team, for example, by a difference or a percentage difference between the current value of a component's CodeCoverage metric and the last previous value of the component's CodeCoverage metric. In the Increase In Test Coverage reports 230, 235, shown in FIGS. 6a and 6b, the IncreaseInTestCoverage metric is the percentage difference between the current value of a component's CodeCoverage metric and the last previous value of the component's CodeCoverage metric.

Depending on the complexity of the component testing timelines, the rate of increase indicates whether, given the current effort, a component will be sufficiently covered.

As testing progresses and more code is exercised, it is likely that the value of a component's IncreaseInTestCoverage metric 630 will increase. In some embodiments, the metric may show a sharp upward trend and plateau as the IncreaseInTestCoverage metric value reaches its threshold and/or the component test cycle comes to an end point. A negative value for the IncreaseInTestCoverage metric may demonstrate an unacceptable level of code coverage, and/or may suggest that the testing on the component has been of poor quality. It may also suggest that a developer may have added code to a component without documenting it in the revision control system 60 or without changing the test case. For example, in an embodiment in which the CodeCoverage metric is based on the number of lines of code exercised since the beginning of testing, a change in a component's Code-Coverage metric value from 50% to 25% may indicate that the number of lines of code in the component has changed from 100 to 200 lines of code. Alerted by a negative IncreaseInTestCoverage metric value, the development team may take measures to document the code changes or correct the test case.

Referring to the All Metrics reports 240, 245 shown in FIGS. 7*a*, 7*b*, the NumberOfUntestedComponents metric 751, indicates how many components have not yet been exercised during testing. Similarly, the NumberOfUntestedHighComplexityComponents metric 791 (also known as the NumberOfUntestedComplexComponents metric 791) demonstrates the number of complex components in the software system for which testing has not yet started. The RatioOfUntestedToTotalComponents metric 755 demonstrates the proportion of components in the software system for which testing has not yet started. Similarly, in one embodiment, the RatioOfUntestedComplexToTotalComponents metric 795 may demonstrate the proportion of complex components in the software system for which testing has not yet started, relative to the total number of components in the software system. In another embodiment, a RatioOfUntestedComplexToTotalComplexComponents metric may demonstrate the proportion of untested complex components in the set of complex components.

As testing progresses and more code is exercised, it is likely that the value of metrics 751, 755, 791, 795 will decrease. In some embodiments, the metric may show a sharp downward trend and eventually become shallow as as the metrics values approach 0 and/or the component test cycle comes to an end point. If the downward trends are shallow slopes, it may indicate that testing goals might not be reached.

The NumberOfComponentsWithPoorCoverage metric 752 (also known as the NumberOfPoorlyTestedComponents metric 752) indicates how many components have not yet been exercised to an acceptable level during testing. Similarly, the NumberOfComplexComponentsWithPoorCoverage metric 792 (also known as the NumberOfPoorlyTestedComplexComponents metric 792) demonstrates the number of complex components in the software system for which code coverage is not yet at an acceptable level. The RatioOfPoorCoverageComponentsToTotalComponents metric 756 (also known as the RatioOfPoorlyTestedToTotalComponents metric 756) demonstrates the proportion of components in the software system for which code coverage is not yet at an acceptable level. Similarly, in one embodiment, the RatioOfPoorlyTestedComplexToTotalComponents metric 796 demonstrates the proportion of complex components in the software system for which for which code coverage is not yet at an acceptable level, relative to the total number of components in the software system. In another embodiment, a RatioOfPoorlyTestedComplexToTotalComplexComponents metric may demonstrate the proportion of poorly tested complex components in the set of complex components.

Acceptable, questionable, and poor levels of code coverage for a component may be defined for preset intervals during testing in the specifications of the testing plan. The amount of code coverage will be defined by the value of the CodeCoverage metric 810 described above.

As testing progresses and more code is exercised, it is likely that the number of components, whether or not complex, with poor coverage will show a downward trend as the component testing proceeds. In some embodiments, the number may show a sharp downward trend and plateau as the component coverage reaches the threshold and/or the component test cycle comes to an end point. It is also likely that the values of metrics 752, 756, 792, 796 will show a downward trend as the component testing proceeds. In some embodiments, the values of metrics 752, 756, 792, 796 may show a sharp downward trend and plateau as the component testing proceeds.

The NumberOfComponentsWithDeterioratingCoverage metric 754 indicates whether the code coverage is decreasing for any components. It may be desirable for the value of metric 754 to be zero across the component testing cycle. If not, it may indicate that the quality of the testing on a component is deteriorating or it may suggest that a developer may have added code to a number of components without documenting the changes in the revision control system 60 or without changing the associated test cases.

The testing system may set threshold values for the metrics 751, 752, 755, 756, 791, 792, 795, 796 at preset intervals (e.g. at 25% completion of component testing period, 50% completion, etc.) to trigger alerts if each of the values of the metrics is not lower than a minimum acceptable value. In addition, the testing system may set threshold values for the CodeCoverage metric 810 and IncreaseInTestCoverage metric 630 for any of the components at the preset intervals to trigger alerts if the value of the metric is not above an acceptable value. In addition, the testing system may set alerts to be triggered at the preset intervals if the value of the NumberOfComponentsWithDeterioratingCoverage metric 754 is non-zero.

Composite Metrics

Composite metrics may be developed based on the values of the above-described metrics of the components undergoing testing. Composite metrics provide management insight into the overall progress of the testing project. One embodiment of a composite metric is the AverageIncreaseInTestCoverage metric 753 shown in the All Metrics report 245 of FIG. 7*b*. The value of the IncreaseInTestCoverage metric for each component undergoing testing may be combined to form an AverageIncreaseOfTestCoverage metric 753.

Another embodiment of a composite metric is the quality of component testing effort (QCTE) metric 759, which may provide a measure of the effectiveness of testing conducted on a set of components. In one embodiment, the value of the QCTE metric 759 may be calculated as $$QCTE = (EffortSpent) * \left(1 - \frac{UnhealthyComponentsIndex}{TotalNumberOfComponents}\right);$$

with
EffortSpent=the measure of the extent of completion of the testing project;
UnhealthyComponentsIndex=an indicator of the extent of unhealthiness of code coverage that is exhibited by the components of the computer system undergoing testing; and
TotalNumberOfComponents=a count of the components being tested.

In one embodiment, UnhealthyComponentsIndex may be a count of components in which the amount of tested software code is below a selected threshold level. The threshold may be selected according to the testing team objectives. A component's eligibility for inclusion in UnhealthyComponentsIndex may be determined directly by the value of the CodeCoverage metric associated with the component, or it may be determined by a code coverage level associated with it. For example, UnhealthyComponentsIndex may be a count of components that have code coverage lower than a selected coverage level. In the embodiment illustrated in FIG. 8b, UnhealthyComponentsIndex may be a count of components that are designated as Unhealthy, i.e., those components as yet untested or that have a value of the CodeCoverage metric that is below the optimum code coverage threshold. Alternatively, UnhealthyComponentsIndex may be a count of components that have a value of the CodeCoverage metric that is below the lowest tolerable code coverage threshold. As noted above, there may be any number of code coverage levels desired by the testing team, with any suitable thresholds defining the levels, and the thresholds and levels, as well as the calculation of UnhealthyComponentsIndex, may be tailored to accommodate the team's testing objectives and team's testing plans.

In another embodiment, UnhealthyComponentsIndex may be a weighted measure of the extent of code coverage that is exhibited by the components of the computer system undergoing testing. The components included in UnhealthyComponentsIndex may be weighted by the extent of their code coverage levels. For example, an untested component may be given a weight that is greater than a poorly tested component. Components with greater levels of code coverage, which may be indicated by larger values of CodeCoverage metrics, may be given less weight than components with smaller levels of code coverage.

In one embodiment, using the levels disclosed in FIG. 8b, an untested component may be given a penalty weight of 1, a component with a value of the CodeCoverage metric in the intolerable code coverage level may be given a penalty weight of 0.7, and a component with a value of the CodeCoverage metric in the tolerable band may be given a penalty weight of 0.5. As an example, in a computer system with ten (10) components, two (2) of which are untested, two (2) of which have intolerable code coverage, and two (2) of which have tolerable but sub-optimal code coverage, $$\text{UnhealthyComponentsIndex} = (2*1) + (2*0.5) + (2*0.7) = 4.4$$

By using a weighted measure of UnhealthyComponentsIndex, projects may more accurately quantify the extent of poor code coverage in the components undergoing testing. In another embodiment, the components of the computer system included in UnhealthyComponentsIndex may also be weighted by their complexity, so that the greater impact that unhealthy code coverage in complex components has on the extent and quality of the testing is accounted for in the calculation of QCTE. It may be seen that the best possible UnhealthyComponentsIndex in a testing project is 0.0.

In one embodiment, EffortSpent may be expressed in terms of person hours. For example, in one embodiment, in a testing project for a software development at 25% completion (with 100 of the 400 person hours already expended), in which UnhealthyComponentsIndex is as calculated above, at 4.4, QCTE may be calculated as $$QCTE = (100)[1 - (4.4/10)] = (100)(0.56) = 56.0,$$

out of a best possible QCTE of 100 at that stage of the testing effort.

In another embodiment in which EffortSpent may be expressed as a percentage of the project completed, QCTE may be calculated as $$QCTE = (0.25)[1 - (4.4/10)] = (0.25)(0.56) = 0.14,$$

out of a best possible QCTE of 0.25 at that stage of the testing effort.

As shown below in the discussion of FIGS. 4b-4c and 5a-c, the choice of term for EffortSpent may depend on the kinds of analyses the development team expects to conduct.

Code Coverage Trends

The analysis unit 126 is configured to identify a trend in code coverage for a component over time. The analysis unit 126 is configured to take into account component size, component complexity, schedule/effort spent and code coverage to identify the 'slopes' of increase in coverage for different component categories (based on size and complexity). If the slopes are shallow or show degradation, the analysis unit 126 generates early warnings to be given to the team.

For example, when the identified trend is one of reduction in code coverage, as demonstrated by increasingly small CodeCoverage metric values over time, the component with which the CodeCoverage metric values is associated is demonstrating deteriorating testing quality.

In one embodiment, the analysis unit 126 is configured to identify guidance to be associated with the identified trend. The analysis unit 126 then may associate the identified trend with at least one description, possible reason, and remediation step. The analysis unit may perform such associations using artificial intelligence techniques and elements such as knowledge bases or repositories of heuristic rules. Alternatively, the analysis unit may have access to stored lists of canned descriptions, possible reasons, and remediation steps for a set of expected trends.

The suggested descriptions, possible reasons, and remediation steps may be tailored for developers with different levels of experience, skill, and assignment. Remediation steps may be provided from several sources inside and outside the organization, including knowledge bases, Wikis, and blogs, and may represent best practices culled from other software development teams. One of ordinary skill in the art will appreciate that there may be several guidance possibilities for different levels of experience, skill, and assignment.

The analysis unit 126 may forward the descriptions, possible reasons, and remediation steps to the analysis reporting unit 132, which may populate the Decreasing Coverage report 320, described below, with the information.

Concern Areas

The analysis unit 126 is configured to identify concern areas based on data related to the testing effort. For example, concern areas may be identified by analyzing the extent and success of the code testing (as measured, for example, by the number of components that remain untested or partially tested) and the amount of time that has passed in testing (for example, the percentage of the schedule that has been consumed to date). CodeCoverage metric and other metric values, such as QCTE, may be analyzed. The development teams may establish threshold levels of acceptability for progress on the project. The threshold may be sliding thresholds, which change over time.

FIG. 8c is a chart 830 illustrating one embodiment of temporal thresholds and severity levels for components in a system undergoing testing. FIG. 8d is a chart 840 illustrating an embodiment of temporal thresholds and severity levels for complex components in a system undergoing testing.

The charts 830, 840 have a column to identify testing phases, where the phases are defined by the amount of time elapsed in the testing schedule. They also have columns for threshold values of the ratio of untested and poorly tested components that may be associated with a testing phase. In chart 830, the ratios are metrics 755, 756, which are ratios based on the extent of testing of all components; and in chart, 840, the ratios are metrics 795, 796, which are ratios based on the extent of testing of complex components. The chart may be color-coded such that each cell of the chart is filled with a color intended to represent a severity level associated with the threshold values. A red-filled cell may indicate that metric values of the identified amount at the identified phase of the testing identify a severe area of concern to the test team. An amber-filled cell may indicate that metric values of the identified amount at the identified phase of the testing identify a marginal area of concern that for which a warning may be issued.

In the embodiment illustrated in FIG. 8c, when between 0% and 25% of the schedule has elapsed, any value of the RatioOfUntestedToTotalComponents metric 755 and RatioOfPoorlyTestedToTotalComponents metric 756 may identify a marginal concern (amber colored cells). When between 25% and 50% of the schedule has elapsed, a value of less than or equal to 50% for either metric 755 or 756 may identify a marginal concern (amber colored cells), and a value of greater than 50% for either metric 755 or 756 may identify a severe concern (red colored cells). When between 50% and 75% of the schedule has elapsed, a value of less than 20% for either metric 755 or 756 may identify a marginal concern (amber colored cells), and a value of greater than or equal to 20% for either metric 755 or 756 may identify a severe concern (red colored cells). When more than 75% of the schedule has elapsed, any value of metric 755 or 756 may identify a severe concern (red colored cells).

In the embodiment illustrated in FIG. 8d, when the elapsed schedule is between 0% and 25%, any value of the RatioOfUntestedComplexToTotalComponents metric 795 and RatioOfPoorlyTestedComplexToTotalComponents metric 796 may identify a marginal concern (amber colored cells). When between 25% and 50% of the schedule has elapsed, a value of less than 30% for metric 795 or less than 50% for metric 796 may identify a marginal concern (amber colored cells); and a value of greater than or equal to 30% for metric 795 or greater than or equal to 50% for metric 796 may identify a severe concern (red colored cells). When more than 50% of the schedule has elapsed, any value of metric 795 may identify a severe concern (red colored cells), while a value of less than 10% for metric 796 may identify a marginal concern (amber colored cells), and a value of greater than or equal to 10% for metric 796 may identify a severe concern (red colored cells).

When concern areas are identified for a component, the analysis unit 126 identifies guidance to be associated with the identified concern area. In one embodiment, the analysis unit 126 identifies at least one concern area and determines a severity of the issue. Severity may be calculated with reference to several factors, including the slope of identified trends in values of the CodeCoverage or QCTE metrics, or, as described above, the temporal information regarding the elapsed available schedule. The analysis unit 126 associates the concern area with the measure of the severity of the issue and guidance such as a description of the concern area and remediation steps. The analysis unit 126 may develop the guidance using artificial intelligence techniques and elements such as knowledge bases or repositories of heuristic rules. Alternatively, the analysis unit 126 may have access to descriptions and remediation steps for a set of expected concern areas. The suggested descriptions and remediation steps may be tailored for developers with different levels of experience, skill, and assignment. One of ordinary skill in the art will appreciate that there may be several guidance possibilities for different levels of experience, skill, and assignment.

The analysis unit 126 may forward the information related to concern areas to the analysis reporting unit 132, which may populate the Overall Unfinished Component Testing—Concern Areas report 330 with the information.

Concern Areas for Complex Components

As noted above, components with high complexity are more difficult to test than components of average complexity. Components with higher complexity require more complex test cases and more time to fully exercise. Therefore, it is occasionally instructive to analyze the metrics associated with complex components instead of analyzing the metrics associated with all of the components. Accordingly, the analysis unit 126 is configured to identify concern areas based on data related to the extent of complexity of the components. For example, concern areas may be identified by analyzing the extent and success of the code testing on complex components.

Complexity may be defined and the complexity level associated with a component may be determined in any way convenient to the development team. For example, the complexity of a component may be established by the system architect based on variables such as size of the component (measured in lines of code), the functional complexity of the component, or the technical complexity of the code. Complexity may be assigned by, for example, members of the development team or by the analysis unit 126 or any other units of the software development system 50 based on characteristics of the components relative to each other.

FIG. 3e is an exemplary component complexity chart 340, with a column 342 for displaying the components of the system, a column 344 for displaying the size of the components, and a column 346 for displaying a measure of the functional or technical complexity of each of the identified components. A component's size may be a count of the lines of code in the identified component. Alternatively, it could be a count of the number of methods or non commenting source statements (NCSS) in the component. The measure of the functional or technical complexity may be a subjective measure of the component's complexity based on the types of features specified for the component and determined by, for example, the project architect or a subject matter expert. Alternatively, it may be numerically derived from the number of functions specified for the component or by using known software metrics such as the Cyclomatic Complexity, which directly measures the number of linearly independent paths through a program's code.

The analysis unit 126 is configured to recognize a subset of complex components. In one embodiment, the analysis unit 126 may populate the subset of complex components with only components having the highest level of complexity, and then conduct its analysis on data from that subset. In another embodiment, the analysis unit 126 may populate the subset of complex components with those components having a complexity level above a selected level. Once a definition of complex component is established, the analysis unit 126 may limit its analysis of the testing results to data from the set of complex components, or it may include data from components with moderate complexity. The analysis unit 126 may then identify concern areas for the subset of complex components in essentially the same manner as the concern areas are identified as described above for the entire set of components, based on data related to the extent of complexity of the components.

In addition, in another embodiment, the analysis unit 126 may limit its analysis of the testing results to data from the set of components with only moderate complexity, or it may limit its analysis of the testing results to data from the set of components with only low complexity, in order to compare results from the different sets of components and to analyze the effect that complexity has on the testing plans currently being undertaken.

When concern areas are identified for the set of complex components, the analysis unit 126 may assign severity levels to them in essentially the same manner as described above for assigning severity levels for concern areas for the entire set of components, with the addition of reference to factors such as the relative complexity of the components. A comparison of the charts 830 and 840 shows that, in the embodiment illustrated in FIGS. 8c and 8d, the severe and marginal areas of concern thresholds are set for untested complex components such that such areas of concern are identified sooner in the testing cycle because, in this embodiment, complex components are expected to be harder to test and therefore their testing needs to be initiated earlier in the testing cycle so that their testing can be completed on time. It can also be seen that, at the end of the schedule, the severe and marginal areas thresholds are more relaxed for poorly tested complex components than for poorly tested components in general because, due to the complexity of their testing, the complex components are expected to be poorly tested for longer in the testing cycle.

The analysis unit 126 may associate the concern area with the measure of the severity of the issue and guidance such as a description and remediation steps identified in essentially the same manner as described above for the entire set of components. The analysis unit 126 may forward the information to the analysis reporting unit 132, which may populate the Complex Component Testing—Concern Areas report 350 with the forwarded information.

Forecasts

The analysis unit 126 is configured to forecast the quality of component coverage and to forecast the quality of component testing effort for a software development project. Such forecasts are useful in predicting whether the team will achieve optimal component testing using the estimated schedule/effort.

The ultimate quality of component testing effort may be forecasted in view of the currently estimated schedule and effort, the current amount of effort and time spent on component testing, and the current quality of output of component testing, Based on early warnings provided by the forecast, teams may optimize the schedule and effort in the component testing strategy to ensure high code coverage and hence reduce defect slippage. For example, the component testing strategy may be adjusted in terms of schedule or planned effort, or the mix or order of components being tested may be modified.

Figure 5C:
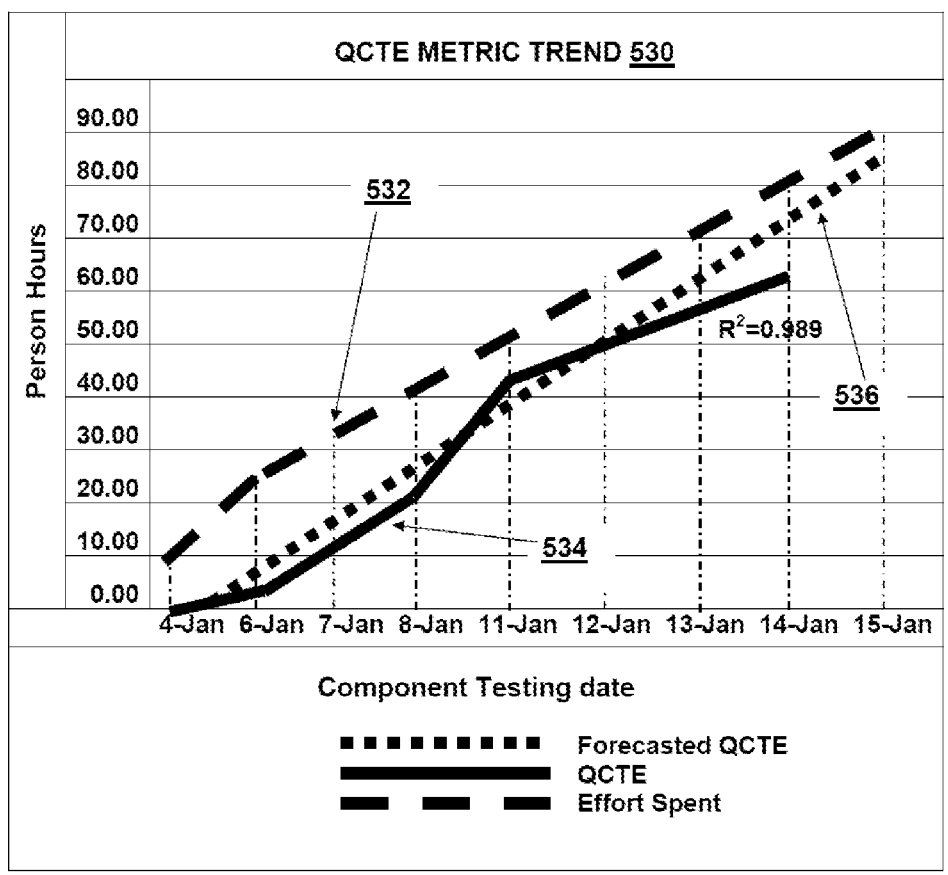

The role that the QCTE metric may play in customizing testing strategies may be shown with reference to the QCTE metric trend graphs illustrated in FIGS. 5a-5c. FIGS. 5a-5c show QCTE Metric Trend reports 510, 520, and 530 for a testing project's target, current, and forecasted QCTE values on three testing review dates. (Jan. 8, Jan. 11, Jan. 14, 2010, respectively). Lines 512, 522, and 532 show the scheduled code testing effort over the life of the testing project, culminating in a QCTE target of 90. Lines 514, 524, and 534 show in graphical form the QCTE values generated from the testing conducted on the indicated dates, and lines 516, 526, and 536 show in graphical form the forecasts of QCTE that were generated based on the QCTE values shown in lines 514, 524, and 534. It can be seen that, in FIG. 5a, a big gap existed and was going to grow between the projected testing effort (line 512) and the forecasted QCTE (line 516) over time. The gap indicated that the project was not likely to achieve high code coverage by the end of testing. Team management, reviewing FIGS. 5a, may take actions to ensure that QCTE is high by the end of the project. Based on the visibility of the effort/quality gap provided by FIG. 5a, the team may analyze lower-level metrics, such as are displayed in FIG. 6a, 6b, 7a,7b, and 8a (described below) to gain an understanding of the underlying problems in testing that are causing the gap. The team may also revisit the testing plans to identify the extent to which they covered project requirements and to revise the plans to address the underlying problems and meet project goals. As can be seen in FIG. 5b, the testing plan revisions result in a quality forecast (line 526) that more closely approached the projected testing effort (line 522). As can be further seen in FIG. 5c, the quality forecast (line 536) continued to closely approach the projected testing effort (line 532).

The Analysis Report 200

Figure 2:
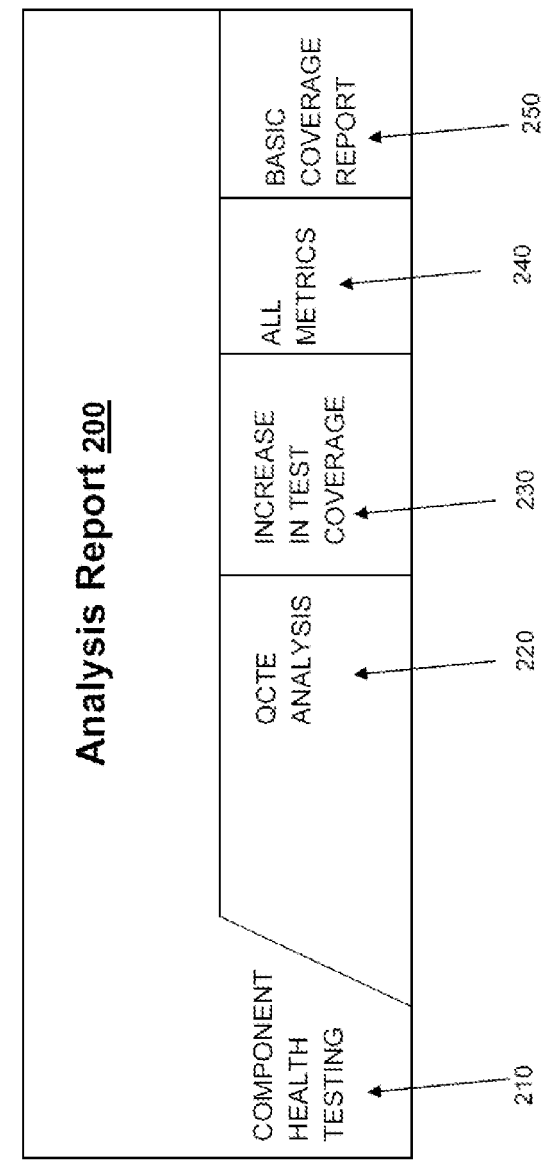
FIG. 2 is a block diagram of an exemplary Analysis report 200 from the analysis reporting unit 132 shown in FIG. 1b.

FIG. 2 shows one embodiment of an Analysis report 200 that may be generated by the analysis reporting unit 132 and displayed by the analysis display unit 134. The analysis report 200 may be created in spreadsheet form such as may be created using the Microsoft Office Excel™ spreadsheet application from Microsoft Corporation of Redmond, Wash. The analysis report 200 may have a sheet containing a Component Health Testing report 210, a sheet containing a Quality Of Component Testing Effort (QCTE) report 220, and sheets containing reports of the supporting data that are used as input into the reports 210 and 220. In one embodiment, the reports of supporting data may be an Increase In Test Coverage report 230, an All Metrics report 240, and a Basic Coverage report 250.

The Component Health Testing Report 210

In the embodiment of the Component Health Testing report 210 shown in FIG. 3a, the report 210 has a Component Coverage Health report 310, a Components Showing Decreasing Coverage report 320, an Overall Unfinished Component Testing—Concern Areas report 330, and a Complex Component Testing—Concern Areas report 350.

The Component Coverage Health Report 310

One embodiment of the Component Coverage Health report 310 is shown in more detail in FIG. 3b. The report 310 has a column 312 to identify the components of the software system being developed and columns 314a and 314b for each date that the components were tested. The report may be color-coded such that each cell of the report is filled with a color intended to represent an extent of code coverage for the component on the selected date. A red-filled cell may indicate that the associated component on the associated date has an unacceptable level of code coverage. An amber-filled cell indicates that the code coverage is marginal (testing quality is questionable). A green-filled cell indicates that the code coverage is acceptable.

In the embodiment illustrated in FIG. 3b, a component is deemed to have unacceptable code coverage on a selected testing date (and its associated cell assigned a red fill color) when its code coverage metric value is less than 65% or it has a negative IncreaseInTestCoverage metric value. A component is deemed to have questionable code coverage on a selected testing date (and its associated cell assigned an amber fill color) when its code coverage metric value is between 65% and 79.9%. A component is deemed to have acceptable code coverage (and its associated cell assigned a green fill color) when the code coverage metric value for the component is equal to or greater than 80%. As can be seen in FIG. 3b, all of the components tested Mar. 25, 2010 demonstrated unacceptable code coverage, and only component (D5) had improved to an acceptable level of code coverage by Mar. 26, 2010.

The Components Showing Decreasing Coverage Report 320

As disclosed above, when a trend such as a reduction in code coverage is identified for a component, the analysis unit 126 forwards at least one description, possible reason, and remediation step for identified trends to the analysis reporting unit 132, which populates the Decreasing Coverage report 320 with an identification of the component with the unacceptable coverage trend in column 322, the associated descriptions, the associated possible reasons, and the associated remediation steps.

One embodiment of the components showing Decreasing Coverage report 320 is shown in more detail in FIG. 3c. The report identifies the component D4 in the Offending Components column 322, and the cell in which D4 is identified may be filled, for example, with a red color to designate that the component's code coverage is decreasing.

A decrease may demonstrate that code changes have been made to the component's code without concomitant changes made in the test case associated with the code. Alerted by a Decrease In The Coverage report, the development team may take measures to amend the test case to exercise newly added code in the component. Column 324 of the report contains an associated description ("Components are showing decreasing test coverage. This is an abnormal situation caused by code changes while component testing is in progress."). Column 326 of the report contains an associated possible reason ("Test coverage drops if a code change is not followed by a test plan revision and Nunit/Junit revisions. Code change might be a result of developers adding features as part of a new change request or because those features were missed in the initial coding stage."). Column 328 contains associated remediation steps ("Check the code revision logs to identifying the extent of code change for the offending components and the cause of code. Revisit the test plans and Nunit/Junit for these components and ensure that the drop in test coverage is arrested immediately!").

The guidance in report 320 is just an instance to be used for a moderately experienced and skilled person. If, for example, the person is new and inexperienced, the guidance may be more detailed and contain, for example, hyperlinks to additional information, or suggestions to consult internal (project or organization level) knowledge bases to make the developer more current with what is common knowledge to a more experienced person.

The Overall Unfinished Component Testing—Concern Areas Report 330

When concern areas are identified for a component, the analysis unit 126 may forward the information to the analysis reporting unit 132, which may populate the Overall Unfinished Component Testing—Concern Areas report 330 with a description of the concern area, the associated measure of severity of the issue, and the associated remediation steps.

One embodiment of the report 330 is shown in more detail in FIG. 3d. The report has a column 332 for displaying the description of a concern area, such as "Untested components exist in the project!" The report has a column 334 for displaying the measure of the severity of the issue associated with the description, such as 62.5%, which may be displayed in a cell filled with a red color to designate an alert situation has occurred in the testing of the components. The definition of an alert situation may be based on the objectives of the testing team and may be determined by development team members. It may include types of concern that are inherently severe, and/or it may include concerns that could also be minor but have passed a severity threshold. In the embodiment shown in FIG. 3d, an alert may be called when more than 10% of components are untested. In other embodiments, severity may be defined in terms of the testing schedule so that issues of potential concern at the start of the test cycle are not deemed a problem (and accordingly not severe), but they would be considered severe later in the test cycle. Column 336 of the report contains an associated remediation step ("The project has consumed more than 25% of its estimated component testing effort. Occurrence of untested components in this phase indicates that only a few components have been selected for testing. Prioritize effort and resources to ensure that all components get attention.").

The report may display in separate rows each concern area identified by the analysis unit 126. For example, the report 330 illustrated in FIG. 3d has two rows, the first row 331 for displaying the information disclosed above related to a first concern area, and a second row 333 for displaying the information related to a second concern area described by "Poorly tested components exist in the project!" The second concern area has a severity value of 87.5% (with a red filled cell) and the following suggested remediation step: "The project has consumed more than 25% of its estimated component testing effort. Occurrence of poorly tested components in this phase indicates slow testing effort! Prioritize effort and resources to ensure that test coverage for components selected for testing reach optimal coverage soon." In the context of poor testing coverage, The guidance in report 330 is a representative instance to be used for a moderately experienced and skilled person. If, for example, the person is new and inexperienced, the guidance may be more detailed and contain, for example, hyperlinks to additional information, or suggestions to consult internal (project or organization level) knowledge bases to make the developer more current with what is common knowledge to a more experienced person.

The Complex Component Testing—Concern Areas Report 350

As noted above, the analysis unit 126 is configured to identify concern areas based on data related to the extent of complexity of a subset of the components. When concern areas are identified for a subset of complex components, the analysis unit 126 may forward the information to the analysis reporting unit 132, which may populate the Complex Component Testing—Concern Areas report 350 with a description of the concern area, the associated measure of severity of the issue, and the associated remediation steps. One embodiment of the report 350 is shown in more detail in FIG. 3f. The report has a column 352 for displaying the description of a concern area, such as "Untested complex components exist in the project!" The report has a column 354 for displaying the measure of the severity of the issue associated with the description, such as 33.33333588%, which may be filled, for example, with a red color to designate the presence of a severe area of concern. Column 356 of the report shown in FIG. 3f contains an associated remediation step ("The project has consumed more than 25% of its estimated component testing effort. Occurrence of untested complex components in this phase is unusual. Prioritize effort and resources to ensure that complex components get priority attention.").

The report 350 may display in separate rows each concern area for complex components identified by the analysis unit 126. For example, the report 350 illustrated in FIG. 3f has two rows, the first row 351 for displaying the information disclosed above related to a first concern area for complex components, and a second row 353 for displaying the information related to a second concern area described by "Poorly tested complex components exist in the project!" The second concern area has a severity value of 100% (with a red filled cell) and the following suggested remediation step: "The project has consumed more than 25% of its estimated component testing effort. Occurrence of poorly tested complex components in this phase is unusual. Prioritize effort and resources to ensure that complex components get priority attention."

Areas of concern and their relative severity for the set of complex components may be defined according to program objectives. They may be defined in a manner similar to areas of concern and their relative severity for the entire set of components, discussed above. Alternatively, due to the nature of component complexity, the definition of areas of concern and their relative severity for the set of complex components may differ significantly from the definition of areas of concern and their relative severity for the entire set of components.

The guidance in report 350 is just an instance to be used for a moderately experienced and skilled person. If, for example, the person is new and inexperienced, the guidance may be more detailed and contain, for example, hyperlinks to additional information, or suggestions to consult internal (project or organization level) knowledge bases to make the developer more current with what is common knowledge to a more experienced person.

The QCTE Analysis Report 220

As noted above, the analysis unit 126 analyzes the quality of the effort expended in component testing, and outputs its findings to the visualization system 130. In the embodiment of the Quality Of Component Testing Effort (QCTE) analysis report 220 shown in FIG. 4a, the QCTE analysis report 220 has a table section for displaying a forecast of quality of component testing effort in a table 410 for the project and a graph section for displaying a graph 420 of the forecast shown in the forecast section.

In embodiments illustrated by FIGS. 4b and 4c, the QCTE target of 100% code coverage, is the best case quality. Projects may strive to meet this target. One embodiment of a table 410 of a QCTE forecast is shown in more detail in FIG. 4b. The forecast 410 has a column 412 showing the dates that testing quality is measured, a column 416 for displaying the current forecast, and a column 414 for reporting the current quality of the testing. Forecasted Quality (column 416) shows the forecasted value of the QCTE metric for the testing of the software system for the selected date according to the established component testing strategy. Column 416 indicates the expected quality of code testing effort for the testing over the component testing cycle. The Current Quality (column 414) demonstrates the quality of component testing effort to date. Current QCTE may reflect a value better than or at least equal to the projected forecast for a day. Current code coverage may reflect a value better than or at least equal to the projected forecast for a day.

In one embodiment, the forecasted and actual values of the QCTE metric may be displayed with color-coding such that each cell of the report may be filled with a color intended to represent an extent of code coverage for the set of components under testing on the selected date. Thus, the QCTE table (FIG. 4b) may show the "goodness" of the QCTE forecast—Green, Amber and Red. A red-filled cell may indicate that the components on the associated date had an unacceptable level of code coverage. An amber-filled cell may indicate that the code coverage of the components is marginal (testing quality is questionable). A green-filled cell may indicate that the code coverage of the components is acceptable. In the embodiment illustrated in FIGS. 4b, it can be seen that on March 26, while Current QCTE is at a poor level (0.125), it reflects a value better than the projected forecast (0.00) for the day. Therefore, the table of FIG. 4b may suggest that the current testing is proceeding acceptably at this stage in the testing schedule.

One embodiment of a graph 420 of a QCTE forecast is shown in more detail in FIG. 4c. Line 422 shows the QCTE target of 100% code testing effort. Lines 424 and 426 show in graphical form the data in FIG. 4b columns 414 and 416, respectively. Line 424 shows the current quality of the component testing effort on two dates, March 25, and March 26. Forecasted QCTE (line 426) shows the forecasted value of the QCTE metric for the selected date according to the established component testing strategy.

FIG. 4c illustrates a gap between the QCTE target (line 424) and the forecast (line 426), indicating that the project was likely to fail to achieve high code coverage. In reviewing the table 410 of FIG. 4b and the graph 420 of FIG. 4c, team management may then take actions in revising the strategy plan to adjust the target, schedule, effort plan and/or components being tested to increase the likelihood that target will be obtained. The team will select its strategic actions based on review of FIGS. 4b and 4c and an understanding of project objectives.

In one embodiment, it may be preferable for the forecast to reach a code coverage level (such as, for example, 90%) sooner in the cycle. The forecast 410 may be developed for different testing schedules and effort plans to test how quickly objectives may be reached. In addition, in one embodiment, the structure of the component testing strategy may be modified mid-implementation to force the component testing to reach a goal earlier or later in the testing cycle, depending on project objectives.

The Supporting Data Reports

In the embodiment shown in FIG. 2, the Analysis report 200 contains reports of the supporting data, namely an Increase In Test Coverage report 230, an All Metrics report 240, and a Basic Coverage report 250, that were used to create the Component Health Testing report 210 and QCTE Analysis report 220.

The All Metrics Report 240

One embodiment of the All Metrics report 240 is shown in FIG. 7a, and another embodiment of the All Metrics report 245 is shown in FIG. 7b. The metrics displayed in the reports 240 and 245 are described above. As can be seen, the list of metrics in report 240 is different than in report 245. The types of metrics in an All Metrics report will depend on the team's project objectives.

The reports 240 and 245 may be used to exhibit the trends in slopes and variances with which the project team can use to comprehend the 'goodness' of component testing effort. A comparison of the values of metrics reported in report 240 across the days of testing (in this case, two days), shows progress in testing. The number of untested components and the number of untested complex components reduced over time, showing that testing is progressing over time. In addition, while the number of poorly tested complex components stayed the same, the number of poorly tested components reduced over time. The ratios show similar progress. The metrics thus may indicate good progress exhibited by the testing team. Further, the increase in the value of the QCTE metric 759 over time may quantify the progress more subjectively by the other metrics displayed in the All Metrics report 240.

The Basic Coverage Report 250

One embodiment of the Basic Coverage report 250 is shown in FIG. 8a. The report 250 contains the current and past values of the CodeCoverage metric 810 for the components undergoing testing. The report 250 has a column 812 to identify the components of the software system being developed and columns 814*a* and 814*b* for each date that the components were tested. Each cell contains values of the CodeCoverage metric 810 for the selected component on the selected date. The report 250 may be color-coded such that each cell of the report is filled with a color intended to represent the significance of the value of the CodeCoverage metric 810 for the component on the selected date. Referring to FIG. 8*b*, a red-filled cell may indicate that the associated component on the associated date is below the lowest tolerable threshold of code coverage. An amber-filled cell may indicate that the code coverage is in the tolerable code coverage band between the lowest tolerable threshold and the optimum coverage threshold. A green-filled cell may indicate that that the coverage is equal or above the optimum coverage threshold.

As can be seen in FIG. 8*a*, only one of the components tested Mar. 25, 2010 (namely D4) showed a non-zero code coverage. By Mar. 26, 2010, component D4 showed lower code coverage but two more components (D5 and D6) showed a non-zero code coverage. The decrease in code coverage in D4 may indicate that undocumented code changes had occurred in D4 between Testing Day 1 and Testing Day 2.

The project team may use the data in the Basic Coverage report 250 to understand the rationale of the analysis done or to maintain a repository of data for future releases of the same components. For example, if component D4 had been previously released with a 65% code coverage, and is now incorporated into the current system under development with additional features, the project team, by knowing the extent of component testing that happened on the component earlier, may use this knowledge to estimate the component testing effort based on new features that are to be added.

The Increase in Test Coverage Report 230

One embodiment of the Increase In Test Coverage report 230 is shown in FIG. 6*a*. The report 230 contains the current and past values of the IncreaseInTestCoverage metric 630. The report 230 has a column 612 to identify the components of the software system being developed and columns 614*a* and 614*b* for each date that the components were tested. Each cell contains values of the IncreaseInTestCoverage metric 630 for the selected component on the selected date. The report 230 may be color-coded such that each cell of the report is filled with a color intended to represent the significance of the value of the IncreaseInTestCoverage metric 630 for the component on the selected date. A red-filled cell may indicate that the associated component on the associated date is showing a decrease in test coverage. An amber-filled cell may indicate that the there is neither an increase nor a decrease in the test coverage of the associated component on the associated date. A no color-filled cell may indicate that the test coverage of the associated component on the associated date has increased.

As can be seen in FIG. 6*a*, only one of the components tested Mar. 25, 2010 (namely D4) showed increase in test coverage. By Mar. 26, 2010, component D4 showed a decrease in test coverage but two more components (D5, D6) showed increase in test coverage. As discussed above, a decrease in test coverage may occur if, for example, code changes may have been made to the component's code without concomitant changes having been made in the test case associated with the code.

In another embodiment, an Increase In Test Coverage report 235, as shown in FIG. 6*b*, shows increases and decreases in test coverage for eight components for seven days of testing. The report 235 has a column 622 to identify the components of the software system being developed and columns 624*a* to 624*g* for each date that the components were tested. By identifying which components are stagnating during testing (as demonstrated by a shallow increase or a plateau in the increase in a component's code coverage), the report 235 may be used by the testing team to correlate the stagnation with the subject component's coverage already achieved. A component exhibiting stagnation and a poor coverage may demonstrate a severe area of concern. Further, a component showing decreasing coverage on a consistent basis may also be demonstrating abnormal testing behavior, which may need to be remedied immediately by the project team.

From a progress standpoint, the reports 230 and 235 may identify to the project management the manner in which the testing team is implementing the testing plans. For example, a spike in coverage for a component on a day for which testing is not scheduled for the component may indicate deviation from the testing plan. The deviation may indicate that a tester made an undocumented adhoc decision, or it may demonstrate that the testing team simply ignored the testing plans. The management team may then investigate the reason for the deviation and, based on the deviation and the reason, the team can garner different learning and be more efficient and effective in its component testing.

Operation

Automated data collection and analysis provide deeper and proactive visibility into the health of the component testing effort. It removes the need for manual data collection. In addition, periodic (such as daily) reporting of concerns areas and identification of hotspots in component testing allow project teams to take fast action. Thus, the software development component testing analysis system 100 disclosed herein allows project teams to take proactive actions, thereby optimizing component testing effort in-flight. A pro-active approach reduces the defect leakage into subsequent stages of testing.

For example, in one implementation of a software development component testing system, defect slippage from component testing phase to Assembly testing was reduced significantly. Only 1 defect slipped out of 28. Compared to available baseline data, there was a 44% reduction in defect slippage due to the provision of actionable and early insights to a project team.

Figure 9A:
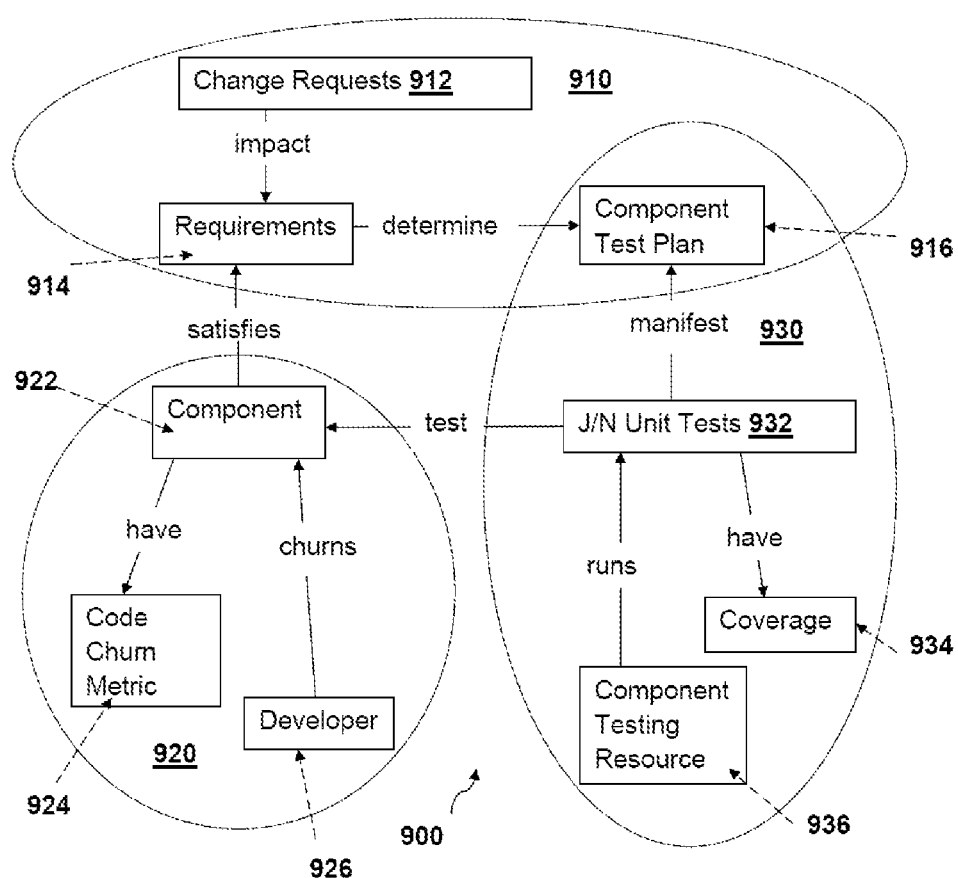
FIG. 9a is a diagram showing a measurement, collaboration, and explanation model 900 of a software system development project.

FIG. 9*a* is a diagram showing a measurement, collaboration, and explanation model 900 of a software system development project. The model 900 may be used to highlight events to be captured during testing and measured for effective component testing. For example, the model 900 illustrates that a component testing resource 936 runs J/N Unit tests 932 on a component 922 according to a component test plan 916 to measure software code coverage 934 for the component 922. Amendments to a component's software code may occur due to change requests 912. The requests may impact the software code requirements that a component 922 must satisfy. In addition, a developer 926 may make undocumented changes (churns) to the software code of a component 922. The extent of the changes may be reflected in the value of a CodeChurn metric 924.

The CodeChurn metric 924 may be defined either in terms of the number of changes made to a file or in terms of number of lines of code added or modified in a file. The CodeChurn metric 924 may be calculated based on the file revision history stored in the storage unit 62 of the source revision control system 60. The CodeChurn metric 924 may be reported in any of the reports described above, but especially reports 230 and 235. The model 900 thus highlights capturing not only data generated by the running of J/N Unit tests 932, but also capturing data related to change requests 912. In addition, values of the CodeCoverage metric 934 and the CodeChurn metric 924 may be generated.

Figure 9B:
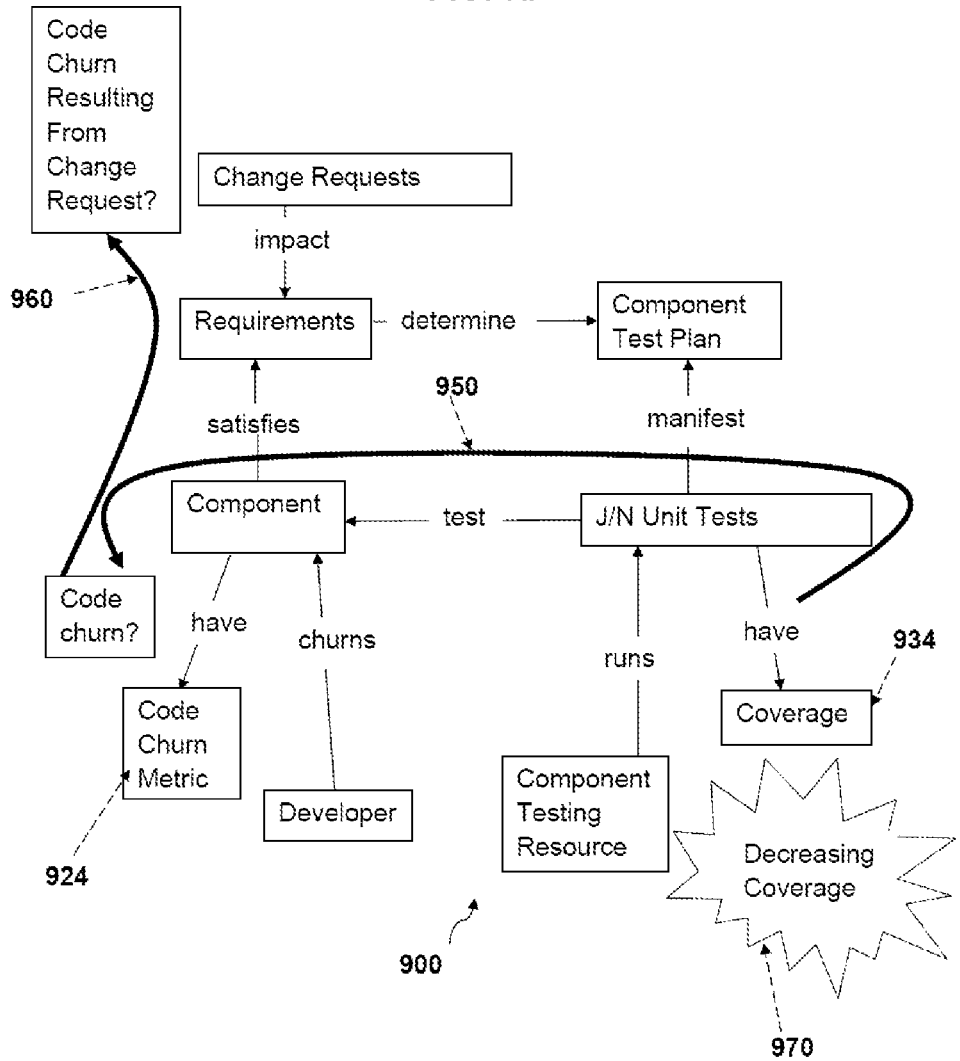
FIG. 9b is another diagram showing the measurement, collaboration, and explanation model 900 modified to demonstrate developing insights using the software development component testing analysis system 100 as shown in FIGS. 1a and 1b.

The model also highlights separate information silos, in the project which need to be connected for effective project collaboration. For example, connections between groupings 910, 920, 930 may be established in order for effective collaboration to occur among develop team members during testing. For example, when a project team receives and accepts a change request for implementation, In certain projects, grouping 910 may make necessary changes to the software design and component test plans to accommodate the change request. If grouping 910, which may be responsible for communicating the changes to the groups 920 and 930, fails to communicate appropriately with group 930 due to time pressure or other organizational reasons, the component testing team may be unaware of the change request and its impact on code, the component test plans, and test cases. Grouping 930 may still be testing based on old plans and cases, resulting in poor quality testing. Such coordination and collaboration issues may occur if the three key groupings—change request management, development and component testing—are not in sync Using the established connections and the model 900, development team members may analyze key phenomena in the project. For example, turning to FIG. 9b, alerted to decreasing code coverage 970 by analyzing the values of the CodeCoverage metric 934, the system development team members may isolate the reason for the decreasing code coverage by identifying components that are undergoing a change and further correlating the code churn with the change requests. Components that are undergoing a change may be identified by reviewing the CodeChurn metric 924. For example, if team members suspect that undocumented code churn is the source of the decreasing code coverage because no evident change request triggered a code change during component testing, the team may investigate the undocumented code change to identify the type and extent of the changes that have been made. The team may identify the type of changes that have been made by identifying the developers who contributed to the undocumented changes. The teams may identify the extent of change by reviewing the decreasing coverage metric values, which will reflect the extent of change in the code. The type and the extent of change then may be used to determine the revisions to be made to the component testing plan and the impact of the changes on the scheduled time and effort of the current pan, FIG. 9b is a diagram showing amendments to the measurement, collaboration, and explanation model 900 modified to demonstrate insights developed using the testing analysis system 100. Lines 950 and 960 represent paths of analysis that a development team member may take to isolate the reason of the decreasing code coverage.

Figure 10:
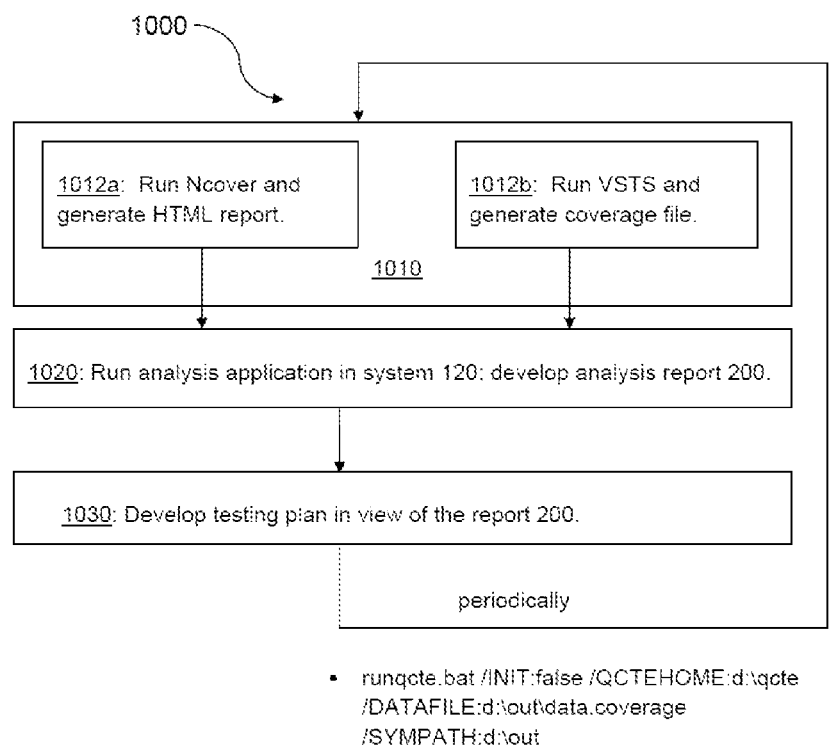
FIG. 10 is a flowchart 1000 depicting an exemplary process for testing a software system having a plurality of components, in which the software system is the subject of a software system development project.

FIG. 10 is a flowchart 1000 depicting an exemplary process for testing a software system having a plurality of components, in which the software system is the subject of a software system development project. In operation, the testing may start in a stage 1010 by the test server 150 running testing software on the system software being developed. In a stage 1010, the testing may be performed by a stage 1012a, in which Ncover is run and an HTML report is generated. Alternatively, in a stage 1012b, VSTS may be run and a coverage file generated. In a stage 1020, testing analysis system 100 may operate to analyze the results of the testing by running an analysis application in analysis system 120, and to generate and to output analysis report 200. In a stage 1030, the results of the analysis of the testing data may be used to develop a testing plan based on the report 200.

Figure 11:
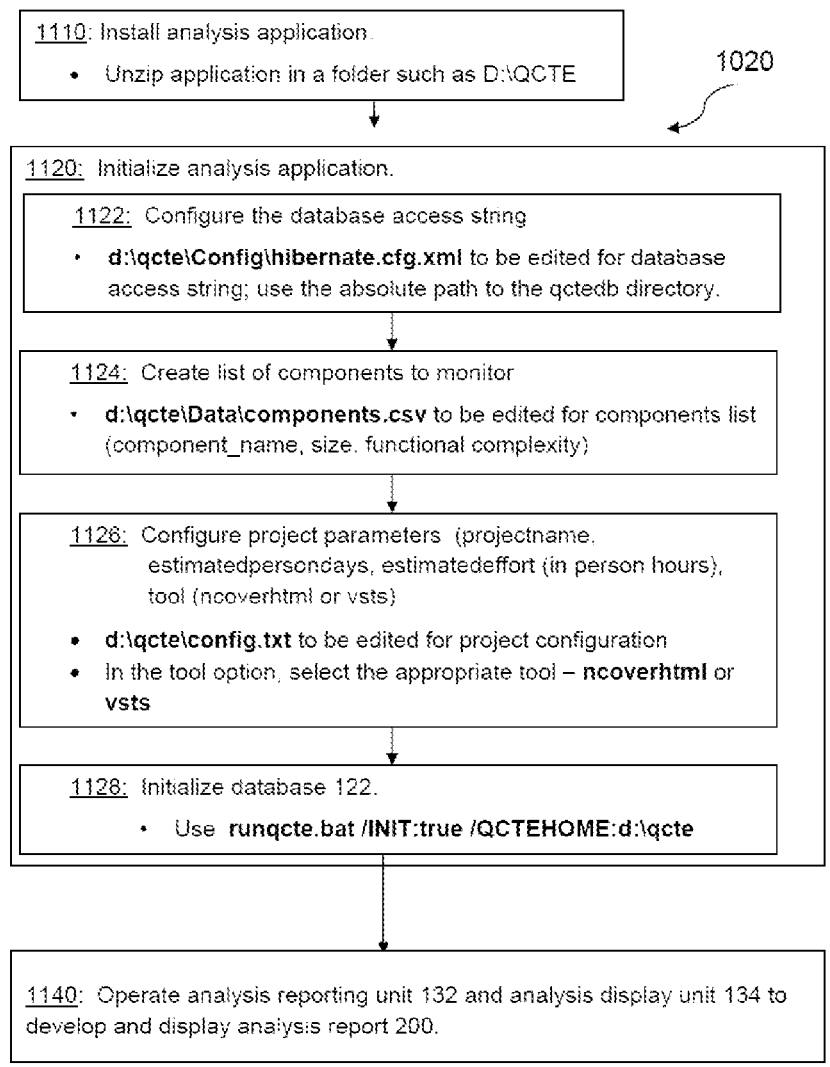
FIG. 11 is a flowchart depicting one embodiment of the stage 1020 for running the analysis application in analysis system 120 as shown in FIG. 1b and developing analysis report 200 as shown in FIG. 10.

One embodiment of stage 1020 is shown in more detail in FIG. 11, in which running an analysis application in analysis system 120 involves a stage 1110 for installing the analysis application. In a stage 1120, the analysis application may be initialized by configuring a database access string (stage 1122), creating a list of components to monitor (stage 1124), configuring project parameters (such as projectname, estimatedpersondays, estimatedeffort (in person hours), tool (ncoverhtml or vsts) (stage 1126), and initializing the database 122 (stage 1128). The analysis reporting unit 132 and analysis display unit 134 are operated to develop and display analysis report 200 (stage 1140), which is used to develop an action plan system based on the report 200.

The testing of stage 1010, analysis of stage 1020 and revision of action plan 1030 may be run periodically, for example every day in order to watch for trends and to keep the metrics and forecasts current and to allow for revisions of the testing plan as indicated by the analysis.

Reduced defect slippage translates into lower cost of rework and more time in subsequent testing stages for stringent product testing. Automated data collection and analysis thus results in better adherence to schedule and cost estimates and higher product quality.

One of skill in the art will appreciate that the above-described stages may be embodied in distinct software modules. Although the disclosed components have been described above as being separate units, one of ordinary skill in the art will recognize that functionalities provided by one or more units may be combined. As one of ordinary skill in the art will appreciate, one or more of units may be optional and may be omitted from implementations in certain embodiments.

The foregoing description has been presented for purposes of illustration. It is not exhaustive and does not limit the application to the precise forms or embodiments disclosed. Modifications and adaptations of the application will be apparent to those skilled in the art from consideration of the specification and practice of the disclosed embodiments. For example, the described implementations may be implemented in software, hardware, or a combination of hardware and software. Examples of hardware include computing or processing systems, such as personal computers, servers, laptops, mainframes, and micro-processors. In addition, one of ordinary skill in the art will appreciate that the records and fields shown in the figures may have additional or fewer fields, and may arrange fields differently than the figures illustrate. It is intended that the specification and examples be considered as exemplary only, with a true scope and spirit of the application being indicated by the following claims.

What is claimed is:

1. A method for evaluating testing of a software system in a testing project in which the testing is performed on software code in a plurality of components of the software system, comprising:

automatically collecting, by a processor, multi-dimensional data related to the testing project, including results of the testing;

developing, by the processor, a Quality of Component Test Effort (QCTE) measure for the testing project, wherein the QCTE measure comprises a quality of testing effort that the plurality of components of the software system have undergone in the testing project, and wherein the QCTE measure is based on a measure of an amount of software code of the plurality of components of the software system that has been tested during the testing project and a measure of an extent of completion of the testing project;

developing, by the processor, projected testing results at completion of the testing by forecasting a projected QCTE measure at completion of the testing project; and analyzing, by the processor, the multi-dimensional data, the measure of the extent of completion of the testing project, a current QCTE measure, and the projected QCTE measure to identify an area of potential concern in the software system.

2. The method of claim 1, further comprising:

developing, by the processor, the measure of the extent of completion of the testing project; and developing, by the processor, the current QCTE measure comprising the QCTE measure to date for the testing project.

3. The method of claim 2, wherein the forecasting comprises developing a measure of predicted likelihood that the testing will achieve a desired level of component testing according to a target testing schedule or a target testing effort.

4. The method of claim 1, further comprising developing remediation advice for the identified area of potential concern in the software system using best practices extracted from other software system projects.

5. The method of claim 4, wherein the analyzing further comprises:

developing insight from the multi-dimensional data, the measure of the extent of completion of the testing project, and the current QCTE measure; and coupling the insight with the best practices to develop the remediation advice.

6. The method of claim 1, further comprising at least one of the following:

developing a projected completion date of the testing to a target extent of completion, developing a measure of a first estimated effort to complete the testing to the target extent of completion, and developing a second estimated effort to complete the testing according to a target testing schedule.

7. The method of claim 1, wherein the QCTE measure is based on a count of components having amounts of tested software code above a threshold level.

8. The method of claim 1, wherein the QCTE measure is generated from:

an amount of scheduled effort consumed by the testing, and a percentage of components determined to have amounts of tested software code above a threshold level.

9. The method of claim 1, wherein the QCTE measure comprises a value generated based on the equation:

$$QCTE = (EffortSpent) * \left(1 - \frac{UnhealthyComponentsIndex}{TotalNumberOfComponents}\right);$$

wherein EffortSpent is the measure of the extent of completion of the testing project;

wherein UnhealthyComponentsIndex is an indicator of an extent of unhealthiness of code coverage that is exhibited by the plurality of components of the software system undergoing testing; and wherein TotalNumberOfComponents is a count of components in the plurality of components of the software system.

10. The method of claim 9, wherein the extent of unhealthiness of code coverage is based on a count of components in the plurality of components of the software system in which an amount of tested software code is below a selected threshold level.

11. The method of claim 10, wherein the extent of unhealthiness of code coverage comprises a weighted measure of an extent of code coverage that is exhibited by the plurality of components of the software system undergoing testing.

12. The method of claim 9, wherein a measure of an extent of code coverage for a selected component is weighted by an associated code coverage level.

13. The method of claim 1, wherein, for a selected component, an amount of software code that has been tested during the testing project comprises a count of lines of software code in the selected component that have been executed during the testing.

14. The method of claim 1, wherein for a selected component, an amount of software code that has been tested during the testing project comprises a count of software code features in the selected component that have been tested during the testing.

15. A method for evaluating testing of a software system in a testing project in which the testing is performed on software code in a plurality of components of the software system, comprising:

automatically collecting, by a processor, multi-dimensional data related to the testing project, including results of the testing;

developing, by the processor for a component in the plurality of components of the software system, a value for a metric for the testing project, wherein the value of the metric is related to a quality of testing effort that the component has undergone in the testing project, and wherein the quality of testing effort for the component is based on a measure of an amount of software code of the component that has been tested during the testing project and a measure of an extent of completion of the testing project;

developing, by the processor, projected testing results at completion of the testing by forecasting a projected value of the metric at completion of the testing project; and analyzing, by the processor, the multi-dimensional data, the measure of the extent of completion of the testing project, a current value of the metric, and the projected value of the metric to identify an area of potential concern in the software system.

16. The method of claim 15, further comprising developing remediation advice for the identified area of potential concern in the software system using best practices extracted from other software system projects.

17. The method of claim 16, wherein the analyzing further comprises:

developing insight from the multi-dimensional data, the measure of the extent of completion of the testing project, and the current value of the metric; and coupling the insight with the best practices to develop the remediation advice.

18. The method of claim 15, wherein the value of the metric is further based on a level of complexity of the software code in the component.

19. A system for evaluating testing of a software system in a testing project in which the testing is performed on software code in a plurality of components of the software system, comprising:

a processor; and a non-transitory computer-readable medium encoding instructions for evaluating the testing of the software system and for execution by the processor, the instructions including:
    a multi-dimensional data collecting module configured to automatically collect multi-dimensional data related to the testing project, including results of the testing;
    a metrics module configured to develop a Quality of Component Test Effort (QCTE) measure for the testing project,
        wherein the QCTE measure comprises a quality of testing effort that the plurality of components of the software system have undergone in the testing project,
        wherein the QCTE measure is based on a measure of an amount of software code of the plurality of components of the software system that has been tested during the testing project and a measure of an extent of completion of the testing project, and
        wherein the metrics module is further configured to develop projected testing results at completion of the testing by forecasting a projected QCTE measure at completion of the testing project; and
    an analyzer module configured to analyze the multi-dimensional data, the measure of the extent of completion of the testing project, a current QCTE measure, and the projected QCTE measure to identify an area of potential concern in the software system.

20. The system of claim 19, wherein the metrics module is further configured to base the QCTE measure on a count of components in the plurality of components of the software system having amounts of tested software code above a threshold level.

21. The system of claim 19, wherein the metrics module is further configured to generate the QCTE measure from:
    an amount of scheduled effort consumed by the testing, and
    a percentage of components in the plurality of components of the software system determined to have amounts of tested software code above a threshold level.

22. The system of claim 19, wherein the metrics module is further configured to generate the QCTE measure based on the equation:

$$QCTE = (EffortSpent) * \left(1 - \frac{UnhealthyComponentsIndex}{TotalNumberOfComponents}\right);$$

wherein EffortSpent is the measure of the extent of completion of the testing project;
    wherein UnhealthyComponentsIndex is an indicator of an extent of unhealthiness of code coverage that is exhibited by the plurality of components of the software system undergoing testing; and
    wherein TotalNumberOfComponents is a count of components in the plurality of components of the software system.

23. The system of claim 22, wherein the extent of unhealthiness of code coverage is based on a count of components in the plurality of components of the software system in which an amount of tested software code is below a selected threshold level.

24. The system of claim 23, wherein the extent of unhealthiness of code coverage comprises a weighted measure of an extent of code coverage that is exhibited by the plurality of components of the software system undergoing testing.

25. The system of claim 22, wherein a measure of an extent of code coverage for a selected component is weighted by an associated code coverage level.

26. A system for evaluating testing of a software system in a testing project in which the testing is performed on software code in a plurality of components of the software system, comprising:
    a processor; and
    a non-transitory computer-readable medium encoding instructions for evaluating the testing of the software system and for execution by the processor, the instructions including:
        a multi-dimensional data collecting module configured to automatically collect multi-dimensional data related to the testing project, including results of the testing;
        a metrics module configured to develop, for a component in the plurality of components of the software system, a value for a metric for the testing project, wherein the value of the metric is related to a quality of testing effort that the component has undergone in the testing project, and wherein the quality of testing effort for the component is based on a measure of an amount of software code of the component that has been tested during the testing project and a measure of an extent of completion of the testing project;
        a results projecting module configured to develop projected testing results at completion of the testing by forecasting a projected value of the metric at completion of the testing project; and
        an analyzer module configured to analyze the multi-dimensional data, the measure of the extent of completion of the testing project, a current value of the metric, and the projected value of the metric to identify an area of potential concern in the software system.

27. The system of claim 26, further comprising an advisor module configured to develop remediation advice for the identified area of potential concern in the software system using best practices extracted from other software system projects.

28. The system of claim 27, wherein the advisor module is further configured to:
    develop insight from the multi-dimensional data, the measure of the extent of completion of the testing project, and the current value of the metric; and
    couple the insight with the best practices to develop the remediation advice.

29. The system of claim 26, wherein the metrics module is further configured to base the value of the metric on a level of complexity of the software code in the component.

30. A computer program embodied on a non-transitory computer readable medium for evaluating testing of a software system in a testing project in which the testing is performed on software code in a plurality of components of the software system,
    wherein the computer program comprises modules encoding interrelated and interdependent processes, including a multi-dimensional data collecting module, a metrics module, a results projecting module, and an analyzer module, and
    wherein the computer program is configured to perform a method comprising:

automatically collecting, by the multi-dimensional data collecting module, multi-dimensional data related to the testing project, including results of the testing;

developing, by the metrics module, for a component in the plurality of components of the software system, a value for a metric for the testing project, wherein the value of the metric is related to a quality of testing effort that the component has undergone in the testing project, and wherein the quality of testing effort for the component is based on a measure of an amount of software code of the component that has been tested during the testing project and a measure of an extent of completion of the testing project;

developing, by the results projecting module, projected testing results at completion of the testing by forecasting a projected value of the metric at completion of the testing project; and analyzing, by the analyzer module, the multi-dimensional data, the measure of the extent of completion of the testing project, a current value of the metric, and the projected value of the metric to identify an area of potential concern in the software system.

31. A computer program embodied on a non-transitory computer readable medium for evaluating testing of a software system in a testing project in which the testing is performed on software code in a plurality of components of the software system, wherein the computer program comprises modules encoding interrelated and interdependent processes, including a multi-dimensional data collecting module, a metrics module, a results projecting module, and an analyzer module, and wherein the computer program is configured to perform a method comprising:

automatically collecting, by the multi-dimensional data collecting module, multi-dimensional data related to the testing project, including results of the testing;

developing, by the metrics module, a Quality of Component Test Effort (QCTE) measure for the testing project, wherein the QCTE measure comprises a quality of testing effort that the plurality of components of the software system have undergone in the testing project, and wherein the QCTE measure is based on a measure of an amount of software code of the plurality of components of the software system that has been tested during the testing project and a measure of an extent of completion of the testing project;

developing, by the metrics module, projected testing results at completion of the testing by forecasting a projected QCTE measure at completion of the testing project; and analyzing, by the analyzer module, the multi-dimensional data, the measure of the extent of completion of the testing project, a current QCTE measure, and the projected QCTE measure to identify an area of potential concern in the software system.

* * * * *